United States Patent
Yanagita et al.

(10) Patent No.: US 6,415,049 B1
(45) Date of Patent: Jul. 2, 2002

(54) APPARATUS FOR DETECTING AND PROCESSING A RADIATION IMAGE

(75) Inventors: Akiko Yanagita; Tsutomu Kawano, both of Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/291,722

(22) Filed: Apr. 14, 1999

(30) Foreign Application Priority Data

Apr. 20, 1998 (JP) .......... 10-109858
May 18, 1998 (JP) .......... 10-135366
May 18, 1998 (JP) .......... 10-135367

(51) Int. Cl.⁷ .............. G06K 9/00
(52) U.S. Cl. ............... 382/132
(58) Field of Search ........ 382/128, 131, 382/132, 168, 170, 172, 181, 190, 254, 276, 206; 378/4, 16, 19, 21, 162, 165; 430/966; 250/580, 591, 336.1, 200, 492.1; 73/61.72; 209/589

(56) References Cited

U.S. PATENT DOCUMENTS 4,538,227 A * 8/1985 Toraichi et al. .......... 378/62
5,046,147 A * 9/1991 Funahashi et al. ........ 250/587
5,410,418 A * 4/1995 Yonezawa ................ 358/456
5,440,130 A * 8/1995 Cox et al. ............ 250/370.09
5,714,764 A * 2/1998 Takeo et al. ............. 250/587
5,880,777 A * 3/1999 Savoye et al. ........... 348/217
6,194,726 B1 * 2/2001 Pi et al. ............... 250/363.1
6,195,474 B1 * 2/2001 Snyder et al. ........... 382/312

* cited by examiner

*Primary Examiner*—Andrew W. Johns
*Assistant Examiner*—Shervin Nakhjavan
(74) *Attorney, Agent, or Firm*—Frishauf, Holtz, Goodman, Langer & Chick, P.C.

(57) ABSTRACT

In an apparatus for processing a radiation image provided with a detector having a plurality of detecting elements which are arranged in two dimensional arrangement, for acquiring the radiation image, for converting the acquired radiation image into electric signals as image signals, and for outputting the image signals; and an image processor for applying an image processing to the image signals, the image processor includes a normalization processor for converting the image signals into normalized image signals which are proportional to an amount of radiation irradiated to the detector or to a logarithm of the amount of the radiation and includes a predetermined signal value.

26 Claims, 24 Drawing Sheets

CANDIDATE
EDGE POINT

SCANNING LINE

CANDIDATE EDGE POINT

APPARATUS FOR DETECTING AND PROCESSING A RADIATION IMAGE

BACKGROUND OF THE INVENTION

This invention relates to an apparatus for detecting and processing a radiation image capable of obtaining a radiation image suitable for diagnosis and so forth.

Heretofore, as a method for obtaining an image signal of a radiation image such as an X-ray image of a human body for diagnosing a disease, a method of reading a photographic film image and a method of using a stimulable phosphor have been known.

In this method reading a photographic film, a laser beam is applied to a radiation photographic film having been subjected to processes such as chemical development and fixing, and the transmitted or reflected light from it is converted into an electrical signal by means of a photoelectric element such as a photo-multiplier tube to obtain image data for each of pixels.

On the other hand, in the method of using a stimulable phosphor, it is utilized a stimulable phosphor, which stores a part of radiation energy, and when a stimulating light such as a visible light is applied, shows stimulated luminescence in accordance with the stored energy, and after radiation image information of a subject is recorded on the stimulable phosphor plate formed of this stimulable phosphor, a laser beam or the like is applied to it so that the stimulated luminescence may be converted to obtain the image data of each pixel.

As mentioned in the above, in the method reading a photographic film or the method using a stimulable phosphor, the radiation image based on the obtained image data becomes an image having a lowered sharpness, because the image data are obtained by collecting the transmitted light, reflected light, or the stimulated light emission. For this reason, image processing is executed for correcting the lowered sharpness.

Further, as a method which can obtain image data without collecting the transmitted light, reflected light, or the stimulated light emission as done in the method reading a photographic film or the method using a stimulable phosphor, it is known a radiation image reading means using an FPD (a Flat Panel Detector), which reads a radiation image with a plurality of detecting elements arranged two-dimensionally. In this method using an FPD, a radiation image having a high sharpness can be obtained, because the image data is generated on the basis of the amount of radiation detected by the respective detecting elements.

However, in the FPD as mentioned above, when the amount of radiation becomes low owing to the variation of exposure conditions etc., S/N ratio is reduced and the image data in proportion to the amount of radiation can not be obtained; hence, it happens a case where a good radiation image suitable for a diagnosis can not be obtained.

SUMMARY OF THE INVENTION

Therefore, according to the object of this invention, it is provided an apparatus for detecting and processing a radiation image capable of obtaining a radiation image suitable for a diagnosis by correcting the influence owing to the variation of the exposure conditions and so forth.

The above object can be attained by the following structure.

(1) An apparatus for processing a radiation image, comprises:

detecting means having a plurality of detecting elements which are arranged in two dimensional arrangement, for radiographing the radiation image by the plurality of detecting elements, for converting the radiographed radiation image into electric signals as image signals, and for outputting the image signals; and image processing means for applying image processing to the image signals, the image processing means comprising normalization processing means for converting the image signals into normalized image signals which are proportional to an amount of radiation irradiated to the detecting means or to a logarithm of the amount of the radiation and includes a predetermined signal value.

Further, the above object can be attained by the following preferable structure.

(2) An apparatus for detecting and processing a radiation image of this invention comprises means for detecting a radiation image which radiographs a radiation image by a plurality of detecting elements arranged two-dimensionally and outputs an image signal generated on the basis of the electrical signal obtained by the plurality of detecting elements, and an image processing means which executes image processing to the image signal outputted from said means for detecting a radiation image, wherein said image processing means comprises a normalization processing means which converts the image signal into a normalized image signal being directly proportional to the quantity or the logarithm of the amount of the radiation applied to the means for detecting a radiation image and including a predetermined signal value determined beforehand, and a gradation processing means which executes a process converting at least the gradation for the normalized image signal obtained by the gradation processing means.

Further, the apparatus for detecting and processing a radiation image of this invention comprises means for storing noise characteristics which stores the information on the noise characteristics peculiar to the means for detecting a radiation image, and carries out the process converting the image signal into a normalized image signal by the normalization processing means using said information on the noise characteristics stored in said means for storing noise characteristics.

Further, the apparatus for detecting and processing a radiation image of this invention comprises means for storing the information on radiographing which stores the control information regarding radiographing, and determines the image processing conditions by the aforesaid image processing means using the information on radiographing stored in said means for storing the information on radiographing.

Besides, the aforesaid image processing means comprises means for setting a region of interest which sets the desired region of interest by analyzing the image signal, and means for determining a representative signal value which determines at least one representative signal value on the basis of the image signal in the set region of interest, and carries out conversion into the normalized image signal such that the representative signal value determined by said means for determining a representative signal value corresponds to the aforesaid predetermined signal value.

Further, the image processing means comprises means for storing gradation conversion curves which stores a plurality of gradation conversion curves and means for storing standard gradation conversion curves which stores a plurality of standard gradation conversion curves, and by selecting one out of said plurality of gradation conversion curves stored in said means for storing gradation conversion curves, or by selecting one out of said standard gradation conversion curves stored in said means for storing standard gradation conversion curves to produce the desired gradation conversion curve by deforming the selected standard gradation conversion curve, converts the gradation of the normalized image signal by the gradation processing means on the basis of the selected gradation conversion curve or the produced desired gradation conversion curve.

Furthermore, the image processing means comprises means for enhancing frequency which carries out frequency enhancing processing and means for dynamic range compression-processing which carries out the compression-processing of dynamic range.

In this invention, the image signal is converted into the normalized image signal by carrying out the normalization based on the information on noise characteristics peculiar to the means for detecting a radiation image, for the image signal from the means for detecting a radiation image. Further, using the control information concerning image acquisition (radiographing), by selecting one out of gradation conversion curves, or by selecting one out of standard gradation conversion curves to produce the desired gradation conversion curve by deforming this selected standard gradation conversion curve, gradation processing is executed for the normalized image signal on the basis of the selected gradation conversion curve or the desired gradation conversion curve. Moreover, frequency enhancing processing and dynamic range compression-processing are also carried out.

Further, in normalizing the image signal, the desired region of interest is set from the image signal, and at least one representative signal value is determined on the basis of the image signals in this region of interest; or a signal area corresponding to the portion of a subject is extracted on the basis of the histogram of the image signals in the region of interest, and the approximately minimum value, the approximately maximum value, or a signal value to make the cumulative histogram value in this signal area a predetermined value; is made to be the representative signal value; thus, the conversion is done in a manner such that this representative signal value corresponds to the predetermined signal value.

Furthermore, it is preferable to use the abovementioned apparatus (1) or (2) in combination with the following structures (3), (4) and (5) respectively.

(3) An apparatus for detecting an irradiation field comprises means for detecting a radiation image which detects the exposure to a subject with the diaphragm limited by a plurality of detecting elements arranged two-dimensionally, and generates the image data of the radiation image, means for obtaining image data which divides the radiation image into a plurality of blocks and reads out the image data of the respective blocks from said means for detecting a radiation image in a parallel manner, means for storing the position of blocks which stores the positions of the respective blocks on the image, means for detecting a candidate edge point which detects one or a plurality of candidate edge points being considered as positioned on a border of an irradiation field for each of the blocks, on the basis of the image data of the respective blocks read out from said means for detecting a radiation image by said means for obtaining image data, and means for forming the border of an irradiation field which forms it as the border of an irradiation field the figure formed by connecting the candidate edge points detected by said means for detecting a candidate edge point, and detects the area surrounded by the border of an irradiation field as the area of the irradiation field.

(4) An image processing apparatus comprises means for detecting a radiation image which detects the quantity of radiation applied and detects a radiation image by generating an electrical signal corresponding to the detected quantity, means for obtaining image data which divides the radiation image into a plurality of blocks and reads out electrical signals from said means for detecting a radiation image in a parallel manner for the respective blocks to generate image data, and means for forming a reduced image which extracts image data at a predetermined position out of the read out image data to form a reduced image at the time of reading out the image data from said means for obtaining image data.

(5) An image processing apparatus comprises means for detecting a radiation image which detects the exposure and detects a radiation image by generating an electrical signal corresponding to the detected amount, means for obtaining image data which divides the radiation image into a plurality of blocks and reads out electrical signals from said means for detecting a radiation image in a parallel manner for the respective blocks to generate image data, means for calculating a representative value of a block which calculates the representative values of the image data for the respective blocks when reading out the image data from said means for obtaining image data, and means for forming a reduced image which forms a reduced image based on the respective signals for one pixel made of said representative values of the respective blocks obtained by said means for calculating a representative value of a block.

DETAILED DESCRIPTION OF THE PREFERRED EMBODIMENT

Figure 1:
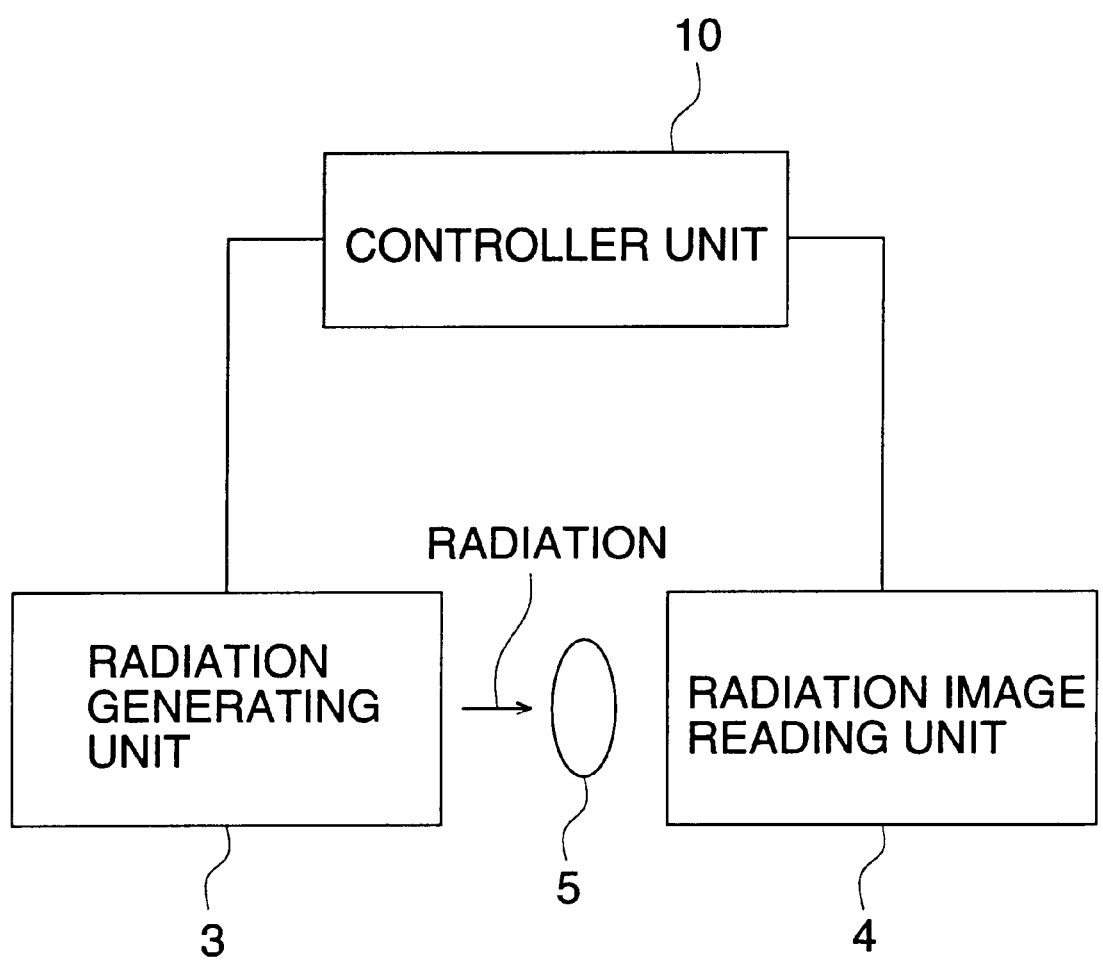
FIG. 1 is a drawing showing the structure of an apparatus for detecting and processing a radiation image.

In the following, an embodiment of this invention will be explained in detail with reference to the drawings. FIG. 1 is a drawing showing the structure of an apparatus for detecting and processing a radiation image. In FIG. 1, the radiation generating unit 3 is controlled by the controller unit 10, and the radiation emitted from the radiation generating unit 3 is applied to the image sensing panel fitted on the front surface of the radiation image reading unit 4 as the detecting means through the subject 5.

Figure 2:
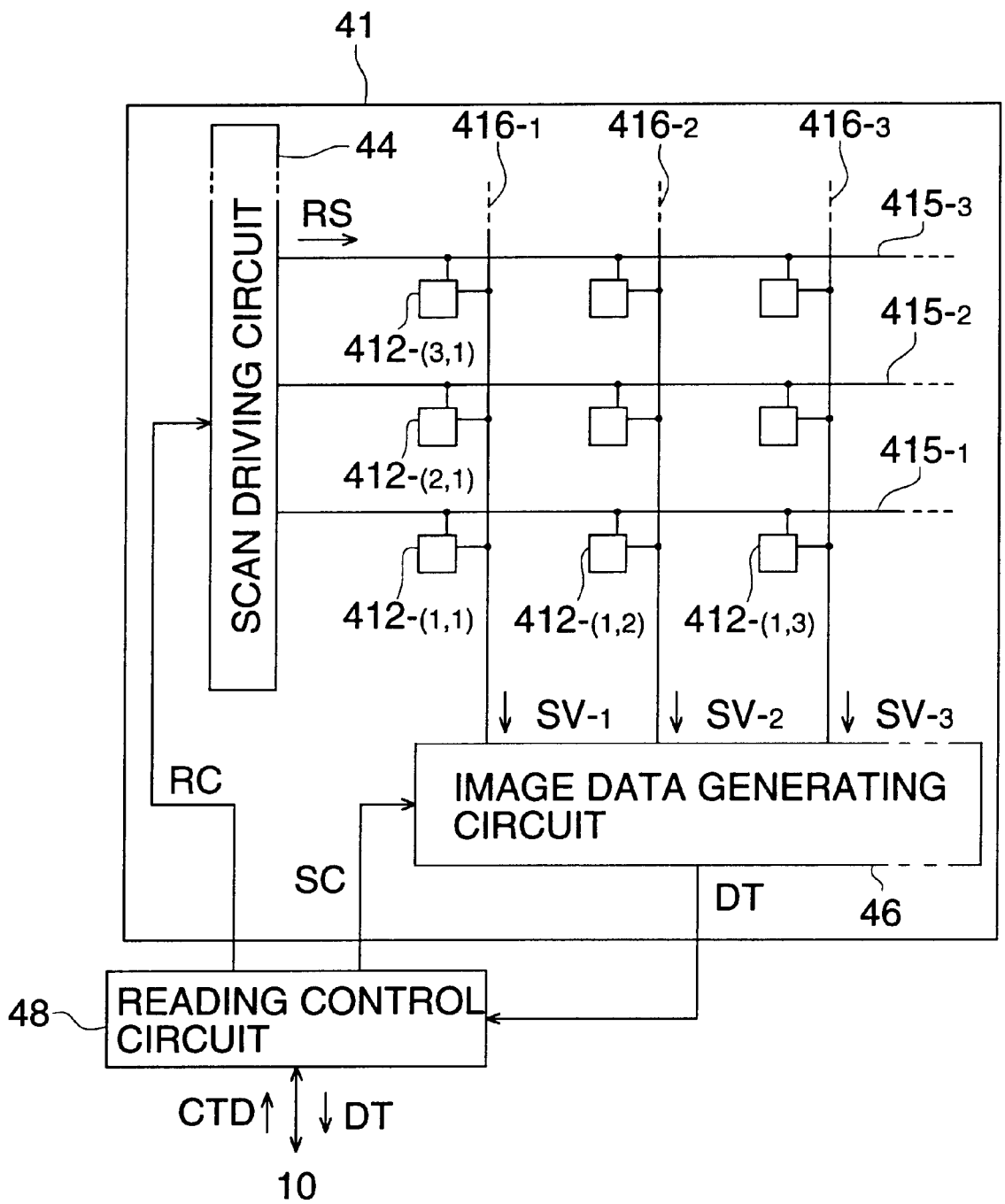
FIGS. 2(*a*), 2(*b*) and 2(*c*) are drawings showing the structure of an image sensing panel.
Figure 2:
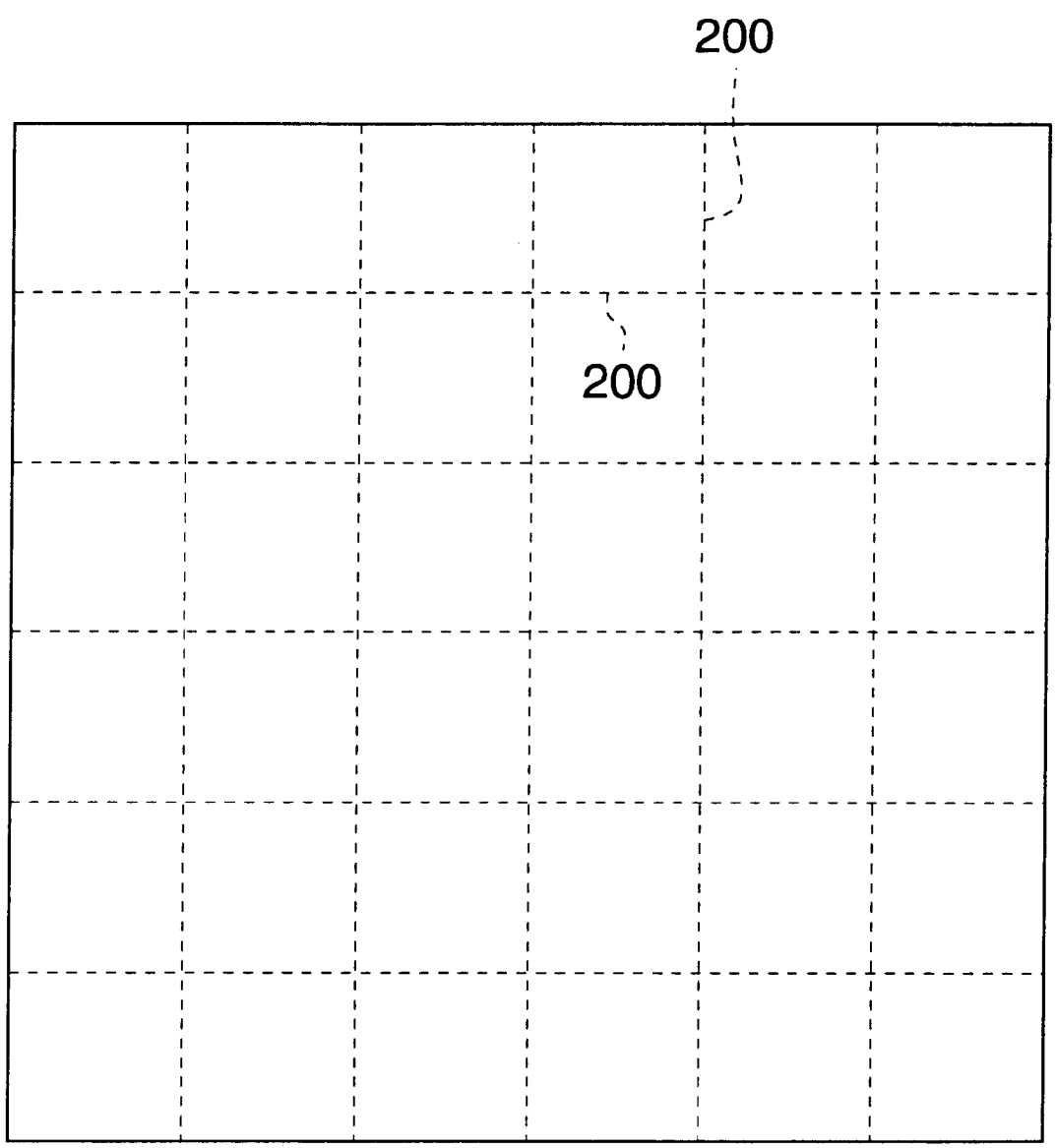
Figure 2:
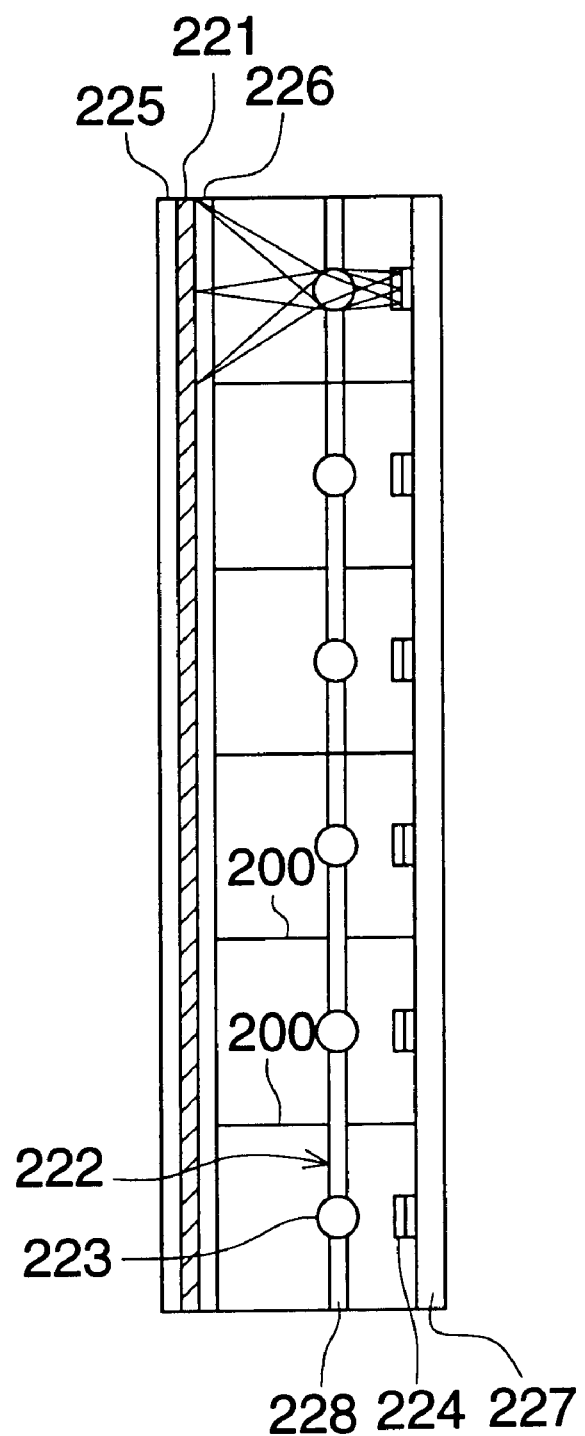

FIG. 2(a) shows the structure of an image sensing panel or a image radiographing (photographing) panel. The image sensing panel 41 comprises a substrate having a thickness capable of getting the predetermined rigidity, and has the detecting elements 412-(1,1) to 412-(m, n) for outputting an electrical signal corresponding to the irradiated amount of radiation arranged two-dimensionally on this substrate. Further, the scanning lines 415-1 to 415-m and the signal lines 416-1 to 416-n is arranged, for example, in the orthogonal manner.

The scanning lines 415-1 to 415-m of the image sensing panel 41 is connected to the scan driving circuit 44. When a readout signal RS is supplied to the scanning line 415-p (p being one of the values 1 to m), one of the scanning lines 415-1 to 415-m, the electrical signals SV-1 to SV-n corresponding to the irradiated amount of radiation are outputted from the detecting elements connected to this scanning line 415-p, and are supplied to the image data generating circuit 46 through the signal lines 416-1 to 416-n.

These detecting elements 412 may be elements of any type so long as they output an electrical signal corresponding to the amount of applied radiation. For instance, in the case where the detecting elements are formed by using a photoconductive layer which has its resistance value varied owing to the electron-hole pairs generated by the application of radiation, the amount of charge generated in this photoconductive layer corresponding to the amount of radiation is stored in the charge accumulating capacitors, and this charge accumulated in the charge accumulating capacitors is supplied to the image data generating circuit 46 as an electrical signal. For the image sensing panel applied with the above structure, the structure disclosed in Tokkaihei 6-342098 (Japanese Patent Publication Open to Public Inspection No. 342098/1994) may be applicable. In addition, as for the photoconductive layer, one having a high dark resistivity is desirable; that is, amorphous selenium, lead oxide, cadmium sulfide, mercuric iodide, and organic materials having photoconductivity (including photoconductive polymers with an X-ray absorbing compound added), and so forth are used, and amorphous selenium is desirable.

Further, in the case where the detecting elements 412 are formed by using a scintillator which emits fluorescence by the application of radiation, it may be appropriate that an electrical signal is generated by a photodiode on the basis of the intensity of the fluorescence generated by this scintillator and is supplied to the image data generating circuit 46.

As the image sensing panel applied with the above structure, it may be permissible to use a panel in which X-ray is absorbed into a fluorescent substance layer such as an intensifying screen so as to generate fluorescence and the intensity of fluorescence is detected by a photodetector such as a photo-diode provided for each pixel, as disclosed in Tokkaihei 9-90048. As the detecting means for the fluorescence, CCD or C-MOS may be used other than the photo-diode.

In particular, in the image sensing panel disclosed by Tokkaihei 6-342098, since an amount of X-ray is directly converted into an amount of electric charge for each pixel, the degradation in sharpness in the image sensing panel is very small and an image being superior in sharpness can be obtained. Therefore, the effect obtained by a X-ray image recording system and an X-ray image recording method by the present invention becomes appreciable. Accordingly, the X-ray image recording system and the X-ray image recording method by the present invention may be used preferably.

Further, the structures shown in FIGS. 2(b) and 2(c) may be used as the image sensing panel 41.

FIG. 2(b) is a front view of a radiation image detector which can be used as the image sensing panel 41. FIG. 2(a) shows an example in which a radiation image detector is constructed by a plurality of units. In FIG. 2(b), dotted lines represent lines indicating lattice 200 of the radiation image detector. However, actually, the dotted lines can be observed from the front, because they are hidden by a protecting layer and a X-ray scintillator. FIG. 2(b) shows an example in which a number of units is 36 pieces (6×6=36). However, the number of units is not limited to this example.

FIG. 2(c) is a schematic diagram of a longitudinal sectional view of a radiation image detector. The radiation image detector is structured such that X-ray scintillator 221, a lens array 222, and an area sensor 224 associating with each lens 223 of the lens array 222 are arranged in the order. The X-ray scintillator 221 is protected by a protecting layer 225. Each lens 223 of the lens array 222 is supported by a lens supporting member 28. Between the X-ray scintillator 221 and the lens array 222 is provided a transparent member 226. The area sensor is supported by a area sensor supporting member 227.

The shape, the thickness and the X-ray path as the structural elements of the radiation image detector are not illustrated precisely. The lattice 200 is not brought in direct contact with the X-ray scintillator 221, but is adapted to collide with the transparent member 226. With this configuration, the lattice 200 is prevented from being damaged due to the collision with the X-ray scintillator 221. In addition, the boundaries among the lattice 200 are prevented from becoming line defects in the image.

FIG. 2(c) shows merely an example of the schematic diagram of the longitudinal sectional view of the radiation image detector. The essential elements of the invention are the X-ray scintillator 221, the lens array 222 and the area sensor 224. Since the X-ray scintillator 21, the lens array 222, and the area sensor 224 associating with each lens 223 of the lens array 222 are arranged in the order, a spatial resolution becomes high, the image quality becomes high, the thickness becomes thick, the size becomes small and the weight becomes light.

The X-ray scintillator 221 comprises gadolinium oxysulfide, cesium iodide or the other material which emit visible light by being irradiated with X-ray. Accordingly, due to the phenomenon that the X-ray scintillator 221 emits visible light by being irradiated with X-ray, the spatial resolution becomes high and the image quality becomes high.

The lens array 222 is structured by a lens group constructed with a combination of plural different lenses 223, whereby the spatial resolution becomes high, the image quality becomes high and the thickness is made thin. The image magnification of the lens 223 is 1/1.5 to 1/20. In the case that the image magnification is smaller than 1/20, the distance from the X-ray scintillator 221 to the lens becomes long and the thickness of the radiation image detector becomes greater.

Further, a solid-state image pick-up elements such as CCD and C-MOS sensor may be used as the area sensor 224, whereby a sharp image can be obtained.

In the image data generating circuit 46 in FIG. 2(a), the supplied electrical signals SV are successively selected on the basis of the output control signal SC from the reading control circuit 48 to be described later, to make digital image signals. The image data DT, this digital image signals, are supplied to the reading control circuit 48.

The reading control circuit 48 is connected to the controller unit 10, and the scan control signal RC and the output control signal SC are generated on the basis of the control signal CTD supplied from the controller unit 10. This scan control signal RC is supplied to the scan driving circuit 44, and supply of the reading signal RS for the scanning lines 415-1 to 415-m is made on the basis of this scan control signal RC. Further, the output control signal SC is supplied to the image data generating circuit 46. By the scan control signal RC and the output control signal SC from this reading control circuit 48, for example, in the case where the image sensing panel 41 is composed of the (m×n) detecting elements 412 as mentioned above, supposing that the data based on the electrical signals SV from the detecting elements 412-(1,1) to 412-(m, n) are the data DP(1,1) to DP(m, n), the image data DT are generated in the order DP(1,1), DP(1,2), - - - , DP(2,1), - - - , DP(m, n), and are supplied from the image data generating circuit 46 to the reading control circuit 48. Further, in the reading control circuit 48, the processing to send these image data DT to the controller unit 10 is also executed.

The image data DT obtained in the radiation image reading unit 4 are supplied to the controller unit 10 through the reading control circuit 48. In addition, if the image data obtained in the radiation image reading unit 4 are logarithm-converted in supplying them to the controller unit 10, the processing of the image data in the controller unit 10 can be made simple.

Figure 3:
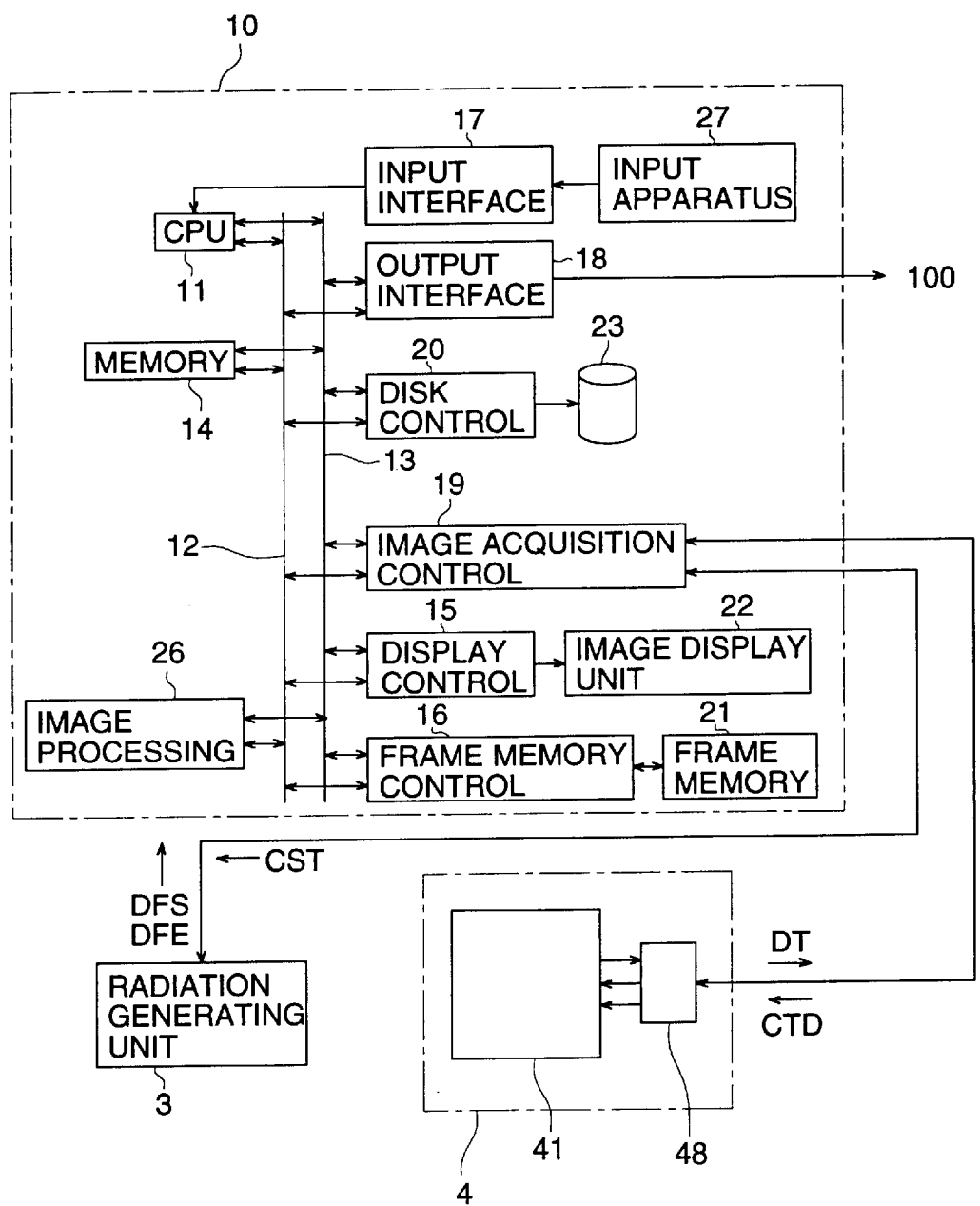
FIG. 3 is a drawing showing the structure of the controller unit.

The block diagram of the controller unit 10 is shown in FIG. 3. The system bus 12 and the image bus 13 are connected to the CPU (Central Processing Unit) 11 for controlling the operation of the controller unit 10. In addition, the CPU 11 for controlling the operation of the controller unit 10 has its operation controlled on the basis of the control program stored in the memory 14.

The display control circuit 15, the frame memory control circuit 16, the input interface 17, the output interface 18, the image acquisition control circuit 19, the disk control circuit 20, and so forth are connected to the system bus 12 and the image bus 13; the operation of the respective circuits are controlled by the CPU utilizing the system bus 12, while the transmission of the image data among the respective circuits are carried out through the image bus 13.

The image data obtained in the radiation image reading unit 4 are stored through the image acquisition control circuit 19 and the frame memory control circuit 16 in the frame memory 21 connected to the frame memory control circuit 16. The image data stored in the frame memory 21 are read out and supplied to the display control circuit 15 and the disk control circuit 20. Further, the image data supplied from the radiation image reading unit 4 can be stored in the frame memory 21 after being subjected to the processing by the CPU.

The image display unit 22 is connected to the display control circuit 15, and the radiation image based on the image data supplied to the display control circuit 15 is displayed on the monitor (screen) of the image display unit 22. If the matrix size (number of pixels) for display of the image display unit 22 is smaller than that of the radiation image reading unit 4, the whole image can be displayed on the monitor by reducing the image size. Further, if the subimage data corresponding to the matrix size of the image display unit 22 are read out, the subimage in the desired position can be displayed in detail.

In supplying the image data from the frame memory 21 to the disk control circuit 21, for example, the image data are successively read out and written in the FIFO memory in the disk control circuit 20, and later they are recorded in the disk unit 23 sequentially.

Furthermore, the image data read out from the frame memory 21 and the image data read out from the disk unit 23 can also be supplied to the external apparatus 100 through the output interface 18.

In the image processing circuit 26, the normalization processing and the gradation processing of the image data DT supplied from the radiation image reading unit 4 through the radiographing control circuit 19. Further, frequency enhancing processing and dynamic range compression-processing etc. may be carried out in the circuit. In addition, image processing may be executed by the structure wherein the CPU 11 has also the function of the image processing circuit.

The input device 27 such as a key board is connected to the input interface 17, and the input of the control information such as the information for recognizing the obtained image data and the information on image acquisition is carried out by operating the input device 27.

As the external apparatus 100 to be connected to the output interface 18, the laser exposing apparatus of scanning type, which is called also a laser imager, is used. In this laser exposing apparatus of scanning type, the intensity of laser beam is modulated by the image data, and after a conventional silver halide photographic photosensitive material or a heat developed silver halide photographic photosensitive material is exposed to the laser beam, the photographic material is subjected to a suitable developing process to obtain a hard copy of a radiation image.

In addition, it has been explained that, in the frame memory 21, the image data supplied from the radiation image reading unit 4 are stored, however, it may be appropriate that the supplied image data are stored after being processed by the CPU 11. Further, in the disk unit 23, the image data stored in the frame memory 21, that is, the image data supplied from the radiation image reading unit 4 or the image data as processed by the CPU 11, can be stored together with the control information and so forth.

In the following, the operation will be explained. In obtaining the radiation image of the subject 5, which is made to be positioned between the radiation generating unit 3 and the image sensing panel 41 of the radiation image reading unit 4, the radiation emitted from the radiation generating unit 3 is applied to the subject 5, while the radiation transmitted through the subject 5 enters onto the image sensing panel 41.

In the controller unit 10, there is inputted the control information, which indicates the information on the recognition and acquisition of the subject 5 to be radiographed, by using the input device 27. This input of the control information using the input device 27 is carried out by operating the key board or by utilizing a magnetic card, a bar code, an HIS (Hospital Information System: information control by a network), and so forth.

This control information is composed of bits of information such as ID number, name, date of birth, sex, date and time of examination, part and portion of the body (for example, to what part of the human body and from which direction radiation is projected), a type of examination (plain radiography, contrast examination, tomography, enlargement radiography, etc.), and exposure conditions (tube voltage, tube current, irradiation time, anti-scatter grid used or not, etc.).

Further, regarding the date and time of examination, the information concerning the calendar and time can be automatically obtained also from the CPU 11 by utilizing the clock function provided in the CPU 11. In addition, regarding the input of the control information, it may be appropriate to input only the information concerning the subject to be radiographed at that time, or it may be appropriate that a series of bits of control information are inputted beforehand, and the subjects are radiographed in the order of the inputted information, or the pertinent control information inputted beforehand is read out and used at need.

When the power source switch of the radiation image reading unit 4 is turned on, initialization of the image sensing panel 41 is carried out by the reading control circuit 48 and the scan driving circuit 44, on the basis of the control signal CTD from the controller unit 10. This initialization is made for obtaining a correct electrical signal from the image sensing panel 41 corresponding to the amount of applied radiation.

When the initialization of the image sensing panel 41 in the radiation image reading unit 4 is finished, the radiation from the radiation generating unit 3 is made possible. At this time, in the case where a switch for applying the radiation is provided on the radiation generating unit 3, by handling this switch, the radiation is applied from the radiation generating unit 3 to the subject 5 for a predetermined time, while the signal DFS indicating the start of radiation and the signal DFE indicating the termination of radiation are supplied to the controller unit 10.

At this time, the amount of radiation incident on each pixel of the image sensing panel 41 of the radiation image reading unit 4 is modulated by the subject 5, owing to the difference in the absorption of radiation for each point of the subject 5. An electrical signal based on the radiation modulated by the subject 5 is generated in each of the detecting elements 412-(1,1) to 412-(m, n) of the image sensing panel 41.

Next, in the controller unit 10, after a predetermined time from the supply of the signal DFS, for example, in the case where the irradiation time is about 0.1 sec., after the passage of time longer than this irradiation time, or immediately after the supply of the signal DFE, the control signal CTD is supplied to the reading control circuit 48 of the radiation image reading unit 4 for starting the generation of the image data DT in the radiation image reading unit 4.

On the other hand, in the case where a switch for applying radiation is provided in the controller unit 10, when this switch is handled, the application start signal CST for starting the application of radiation is supplied to the radiation generating unit 3 through the image acquisition control circuit 19, and the radiation is applied from the radiation generating unit 3 to the subject 5 for a predetermined time. This irradiation time is determined, for example, on the basis of the control information.

Next, in the controller unit 10, after a predetermined time from the output of the application start signal CST, the control signal CTD for starting the generation of the image data in the radiation image reading unit 4 is supplied to the reading control circuit 48 of the radiation image reading unit 4. In addition, in the controller unit 10, it may be appropriate that, after detecting the termination of radiation in the radiation generating unit 3, the control signal CTD for starting the generation of the image data in the radiation image reading unit 4 is supplied to the radiation image reading unit 4. In this case, it can be prevented that the image data are generated during the exposure.

In the reading control circuit 48 of the radiation image reading unit 4, the scan control signal RC and the output control signal SC are generated on the basis of the control for starting the generation of the image data signal supplied from the controller unit 10. At the same time of supplying this scan control signal RC to the scan driving circuit 44, the output control signal SC is supplied to the image data generating circuit 46, and the image data DT obtained from the image data generating circuit 46 are supplied to the reading control circuit 48. This image data DT are sent to the controller unit 10 by the reading control circuit 48.

The image data DT supplied to the controller unit 10 are stored in the frame memory 21 through the image acquisition control circuit 19 and the frame memory control circuit 16. By using these image data stored in the frame memory 21, the radiation image can be displayed on the image display unit 22. Further, by supplying the image data stored in the frame memory 21 to the display control circuit 15 after being processed in the image processing circuit 26, or by storing the image data after being processed in the frame memory 21 and supplying the image data stored in the frame memory 21 to the display control circuit 15, it can be displayed also a radiation image suitable for diagnosis etc. with brightness, contrast, or sharpness adjusted. Further, by supplying the image data having been subjected to image processing to the external apparatus 100, a hard copy of a radiation image suitable for diagnosis can be obtained.

Figure 4:
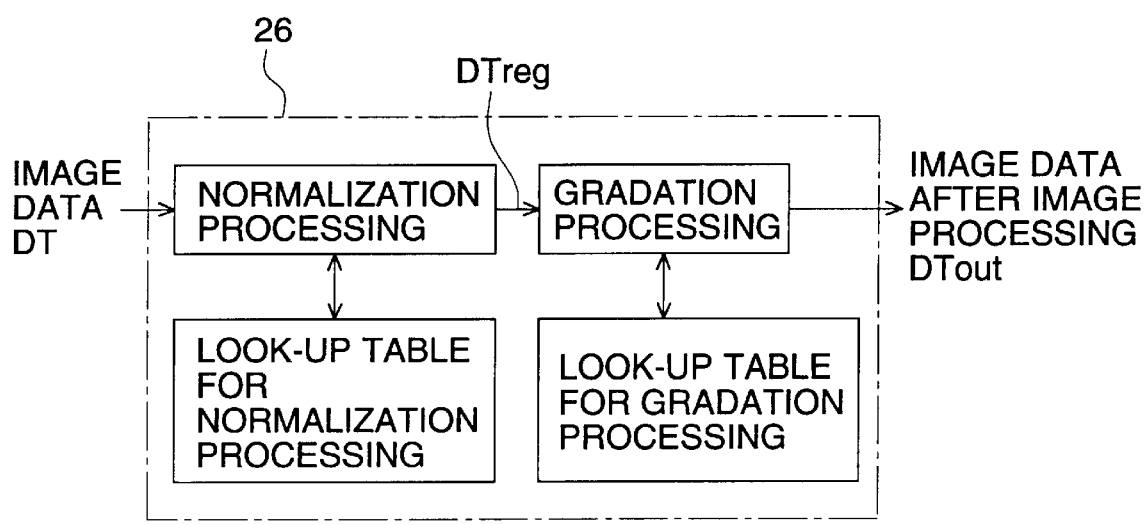
FIG. 4 is a drawing showing the structure of the image processing circuit.

In the image processing circuit 26, in order to obtain always a stable radiation image even in the cases where the distribution of the levels of the image data outputted from the image sensing panel 41 owing to the variation of the amount of radiation, a normalization processing of the image data DT is carried out as shown in FIG. 4. Further, in order to obtain a radiation image having a density range and a contrast suitable for diagnosis etc., a gradation processing is carried out to the normalized image data DTreg, the image data after normalization processing. In addition, in the image processing circuit 26, it is not shown in the drawing but may be appropriate to carry out a frequency enhancing processing for controlling the sharpness of the normalized radiation image for the normalized image data DTreg, or a dynamic range compression-processing for keeping the whole radiation image having a wide dynamic range within a density range suitable for observation without lowering the contrast of detailed structures of a subject.

Figure 5:
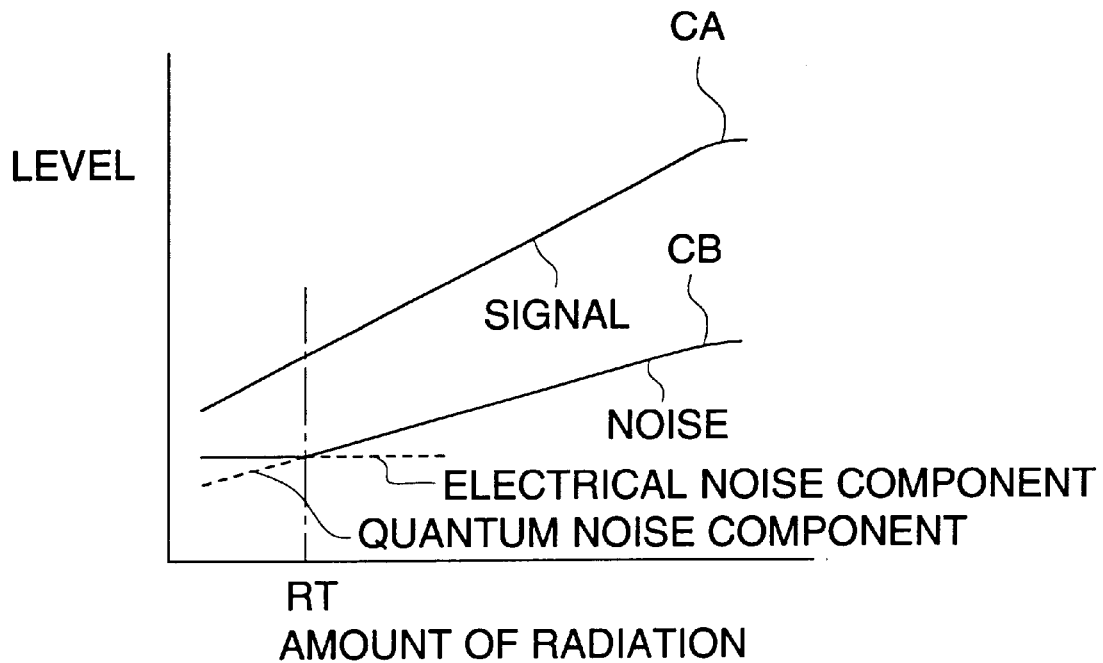
FIGS. 5(*a*) and 5(*b*) are drawings showing the characteristics of the image sensing panel.
Figure 5:
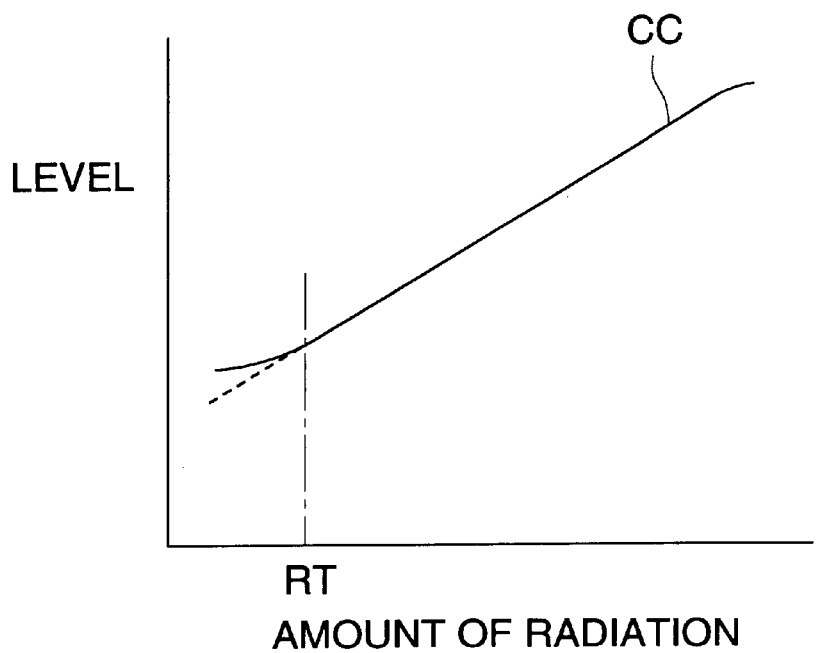

Incidentally, in the image sensing panel 41, it has been known that the signal with the level values shown, for example, by the characteristic curve CA in FIG. 5A is generated, and at the same time, the noise with the level values shown by the characteristic curve CB is generated. In this case, the noise comprises the electric noise component and the quantum noise component; when the amount of radiation is smaller than RT, the noise level is determined by the electric noise component, and when the amount of radiation is larger than RT, the noise level is determined by the quantum noise component. The above-mentioned signal and noise generated in accordance with the amount of radiation are summed up, and the image data are generated on the basis of this summed up signal to be outputted from the image sensing panel 41.

For this reason, the image data outputted from the image sensing panel 41 are made to have the level values depending on the amount of radiation as shown by the characteristic curve CC in FIG. 5B. In this case, the noise characteristics are different according as the amount of radiation is larger than or smaller than "RT"; accordingly, the level of the image data also is made to have different characteristics according as the amount of radiation is larger than or smaller than "RT".

As mentioned above, because the level of the image data has different characteristics for the respective cases where the amount of radiation is larger than "RT" and smaller than "RT", correction of the image data based on the noise characteristics, and further, the normalization to make the corrected data have signal levels desired are carried out, in order that the image data depending on the amount of radiation with the same characteristic for the respective cases where the amount of radiation is larger than "RT" and smaller than "RT" may be obtained.

Now, if the signal VA outputted from the image sensing panel in accordance with the amount of radiation E has the characteristic shown by the equation (1) in which the noise characteristics are taken into consideration, the normalized signal VB can be obtained on the basis of the equation (2) by using the inverse function of the equation (1). Here, "a" and "b" are constants.

$$VA = f(\log E) \quad (1),$$

$$VB = a\, f^{-1}(VA) + b \quad (2).$$

As shown in FIG. 4, in the image processing circuit 26, there is provided a look-up table for normalization processing corresponding to the operation of the inverse function in the equation (2). In this way, by providing a look-up table for normalization processing corresponding to the operation of the inverse function, and referring to the look-up table for normalization processing on the basis of the image data DT from the radiation image reading unit 4, the image data corrected for the influence of the noise characteristics can be obtained simply and rapidly, without performing the operation using the image data DT.

In the present embodiment, the normalization processing look-up table is also used as the memory means for the noise characteristic. However, it may be permissible to provide a noise characteristic storing means to store the noise characteristic shown in FIG. 10 as the curve CC and the normalization processing may be conducted by this noise characteristic and the formula (2).

Figure 6:
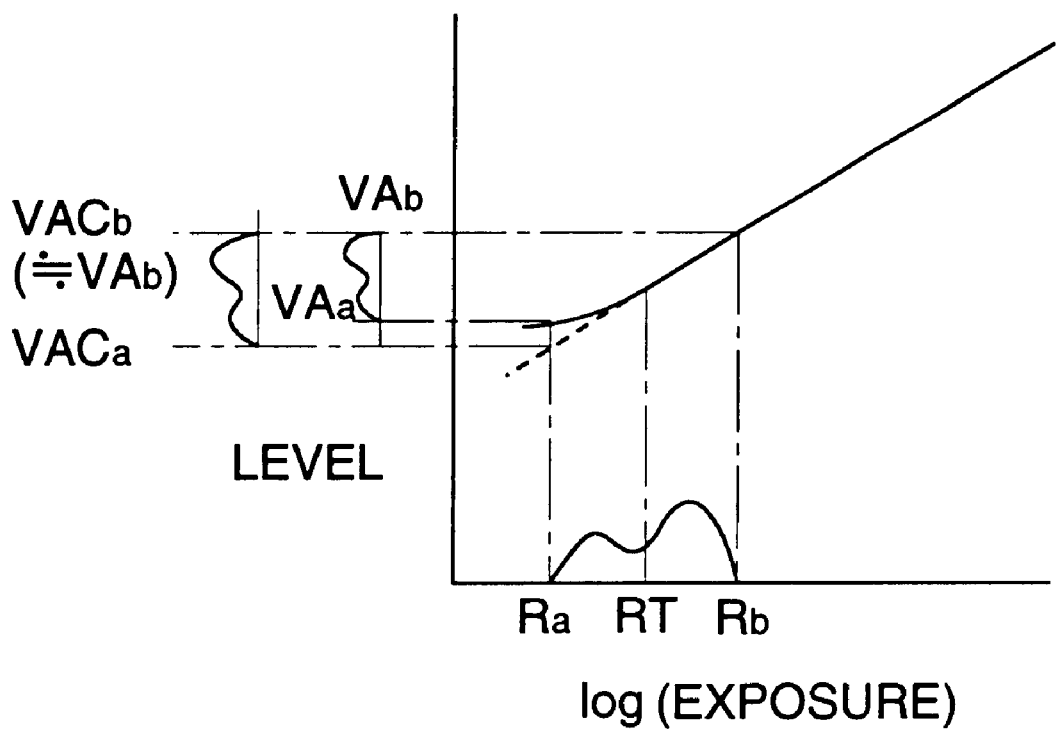
FIG. 6 is a drawing for illustrating the correction for the influence of noise characteristics.

With this normalization processing, in the case, for example, where the distribution of the amount of radiation is within the range "Ra" to "Rb" including "RT" as shown in FIG. 6, the level values of the image data "VAa" to "VAb" can be corrected to be the level values "VACa" to "VACb" (≅VAb)".

In this way, when the correction for the influence of the noise characteristics is carried out, next, it is executed the processing for converting the distribution of the level values obtained by the correction into the desired distribution of the level values.

Incidentally, in radiographing a radiation image, radiologists may protect their subject against unnecessary exposure to X-ray by use of X-ray opaque material such as a lead plate. The material is positioned at a part of the subject or at the radiation generating unit 3.

In the case where this controlling of the irradiation aperture is carried out, if the conversion processing for the level values and the succeeding gradation processing are carried out using the image data of both of the area inside the irradiation field and the area outside the irradiation field, image processing for the portion inside the irradiation field required for diagnosis is not to be executed correctly, owing to the image data of the area outside the irradiation field. Therefore, recognition of the irradiation field is carried out for discriminating the area inside the irradiation field from the area outside the irradiation field.

Figure 7:
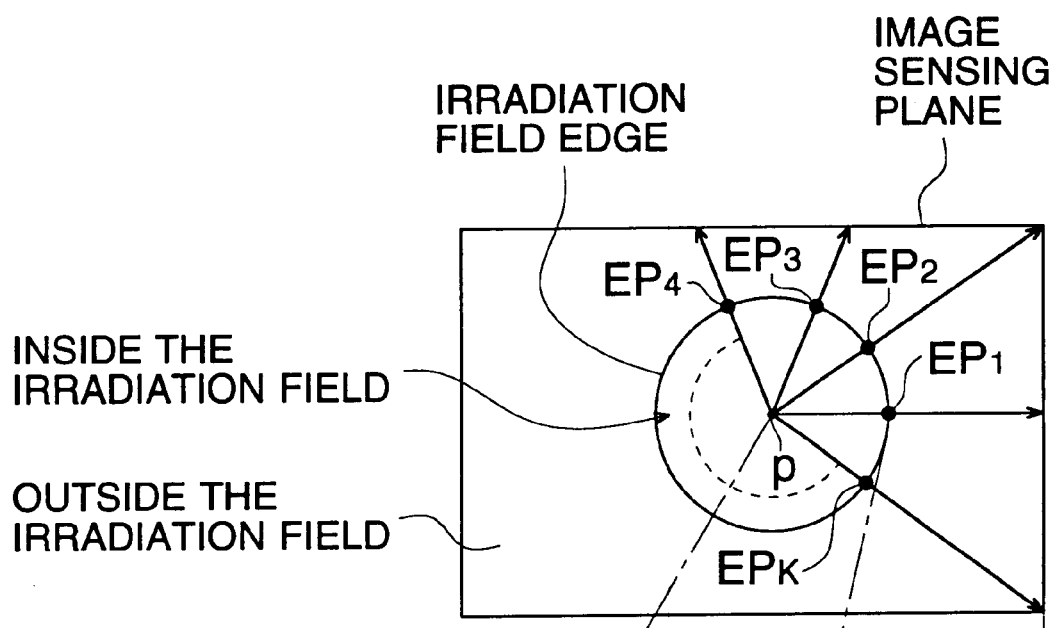
FIGS. 7(*a*) and 7(*b*) are drawings for illustrating the processing for recognizing the irradiated field.
Figure 7:
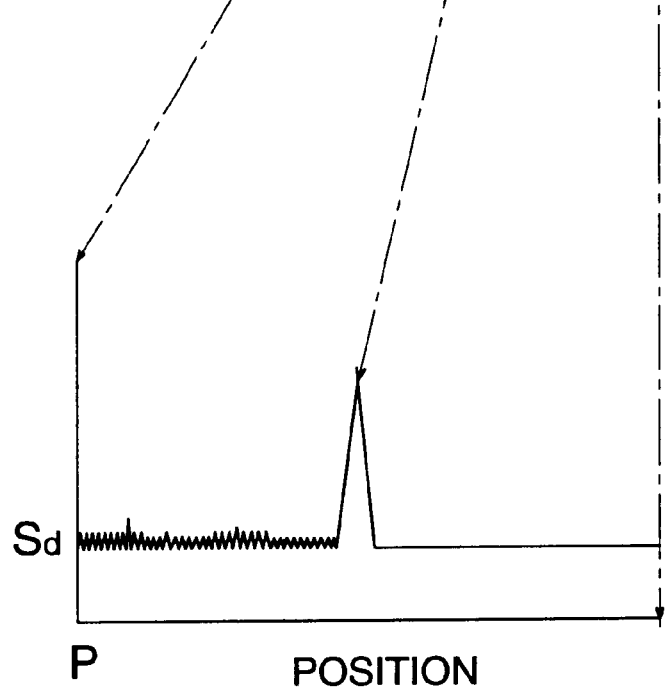

About recognizing an irradiation field, it is used, for example, a method shown in Japanese laid open patent S63-259538, in which a differentiation processing, for example, is carried out using the image data on the line extending from the predetermined position P on the image to the edge of the image as shown in FIG. 7A. The differential signal Sd obtained by this differentiation processing becomes large at the border of the irradiation field as shown in FIG. 7B; hence, by judging the signal level of the differential signal Sd, point EP1 for forming the border of the irradiation field can be obtained. By carrying out this processing for obtaining the edge points of the irradiation field radially around a predetermined position P on the image made as the center, a plurality of EP1 to EPk edge points of the irradiation field can be obtained. By connecting the adjacent points of EP1 to EPk with straight lines or curved lines, the border of the irradiation field can be obtained.

Further, the method shown in Japanese laid open patent H5-7579 can also be used. In this method, when the image sensing plane is divided into a plurality of small regions, the amount of radiation becomes approximately low in the small regions outside the irradiation field to which the radiation is intercepted by the diaphragm, and the value of variance of the image data becomes small. Further, in the small regions inside the irradiation field, the value of variance becomes high in comparison with that of the area outside the irradiation field owing to the modulation of the amount of radiation by the subject. Moreover, in the small regions including an edge portion of the irradiation field, the value of variance becomes highest because the areas include both outside and inside the irradiation field. From this fact, the small regions including a border of the irradiation field can be detected by the value of variance.

Further, a method shown in Japanese laid open patent H7-181609 can also be used. In this method, the image data are rotated with regard to a predetermined center of rotation until the border line of the irradiation field becomes parallel to a coordinate axis of the rectangular coordinates. When the parallel condition is detected by means for detecting parallel condition, the equation of a straight border line before rotation is calculated from the angle of rotation and the distance from the center of rotation to the border line by means for calculating an equation of a straight line. After that, by determining the area surrounded by several border lines, the area of the irradiated field can be determined. Further, in the case where the border of the irradiation field is a curved line, an arbitrary border point is first extracted by means for extracting a border point, and the next border point is extracted from a group of the points around this border point. In the same way, by extracting successive border points one after another from a group of points around the former border point, the irradiation field can be determined even though it has a curved border.

In addition, recognizing an irradiation field can be performed also by using the image data before the correction for the influence of the noise characteristics. On the other hand, if the image data having been corrected for the influence of the noise characteristics are used, it is possible to perform recognizing an irradiation field with a good precision.

When recognizing an irradiation field is carried out in the above-mentioned manner, in converting the distribution of the level values of the image data corrected for the influence of the noise characteristics into the distribution of the desired level values, the area inside the recognized irradiation field is set as the area for determining the distribution of the level values of the corrected image data (hereinafter referred to as "the region of interest"). The representative value is determined from the image data in this region of interest corrected for the influence of the noise characteristics, or from the image data in the signal area to be described later corrected for the influence of the noise characteristics, and by converting this representative value into the desired level, the image data of desired level can be obtained.

This region of interest is not limited to the case where it is equal to the area inside the irradiation field. For example, for the reason that it is commonly done that exposure is carried out with the most important portion for diagnosis positioned at the center of the irradiation field, the region of interest may be set as a circular or a rectangular area in the central portion of the area inside the irradiation field. In this case, the circular or rectangular area is set as the one having its diameter or the length of one side of the rectangle being, for example, "½" to "⅕" of the longer side, the shorter side, or the diagonal of the irradiation field.

Further, the region of interest corresponding to a predetermined anatomical structure may be set inside the irradiation field. For example, as shown in Japanese laid open patent H3-218578, the area of lung portion is determined by means for determining anatomical domain from the data of projections (cumulative values of the image data in one direction) obtained in the longitudinal and transverse directions, and this determined area is set as the region of interest. Further, as shown in Japanese laid open patent H5-7578, on the basis of the result of comparing each pixel value with a threshold value, a flag is put on each pixel, and labeling is made for each group of a series of pixels with a flag indicating that the pixel has a data equal to or larger than the threshold value to determine the area, and this determined area is set as the region of interest.

Next, the representative values D1 and D2 are set from the image data in the region of interest set corrected for the influence of the noise characteristics, and a processing to convert these representative values into the desired levels S1 and S2 is carried out. In another case, an area for setting the representative values (hereinafter referred to as a signal range) is extracted from the region of interest, and the representative values D1 and D2 are set from the image data in the extracted signal range corrected for the influence of the noise characteristics.

Figure 8:
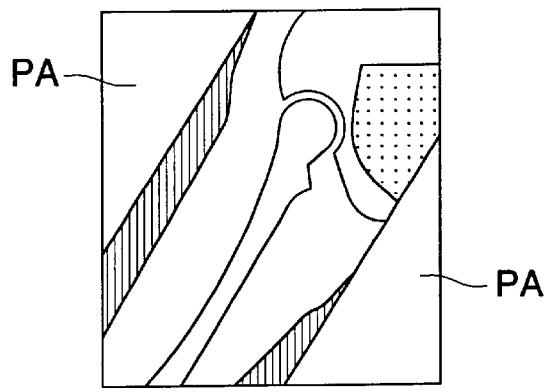
FIGS. 8(*a*), 8(*b*) and 8(*c*) are drawings showing the method of extracting the signal area.
Figure 8:
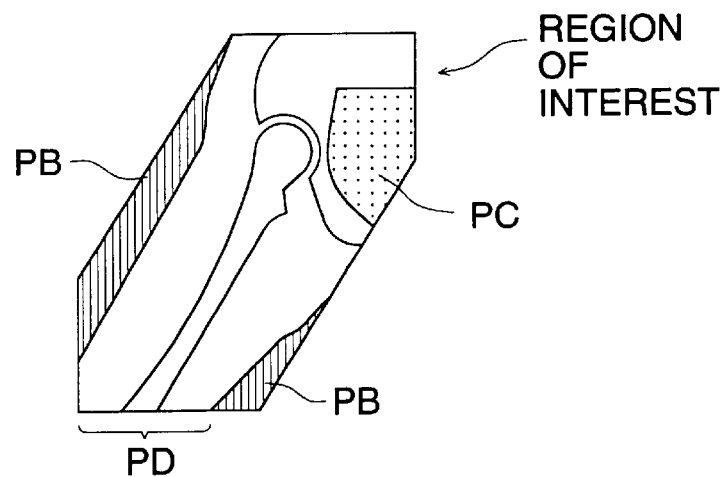
Figure 8:
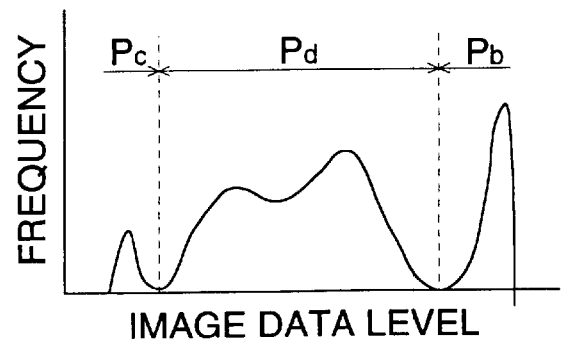

As the method of extracting this signal range from the region of interest, a histogram of the image data is prepared and on the basis of this histogram, the extraction of the signal range is performed. For example, FIG. 8A shows a radiation image of a hip joint of a human body, wherein the area PA is the area to which radiation has not applied owing to making the control of diaphragm. FIG. 8B shows that recognition of the irradiation field has been done and the area inside the recognized irradiation field is set as the region of interest. FIG. 8C shows the histogram of the image data in this region of interest. The direct irradiation area PB in the region of interest shown in FIG. 8B is the area is the directly irradiated area by the radiation which has not pass through the subject, and is exposed to a large amount of radiation. For this reason, the direct irradiation area PB corresponds to the area Pb having larger pixel values as shown in FIG. 8C. On the other hand, the radiation-shielded area PC (the area where shielding against radiation has been done with a protector against radiation or the like) is exposed to a small amount of radiation owing to the interception of radiation. For this reason, the radiation-shielded area PC corresponds to the area Pc having smaller pixel values. Further, in the subject area PD in the region of interest, the radiation is modulated by the subject; thus this subject area corresponds to the area Pd which is positioned between the area Pb having larger pixel values and the area Pc having smaller pixel values. In this way, the subject area can be discriminated by the histogram of the image data; hence, the area Pd is made to be the signal range by eliminating the area Pb having larger pixel values and the area Pc having smaller pixel values as shown in FIG. 8C.

Further, in extracting the signal range, a method shown in Japanese laid open patent S63-262141 can also be used. In this method, the histogram of the image data is divided into a plurality of small regions by the automatic thresholding method using the discriminant analysis or the like, and the desired image portion among the divided small regions is extracted as the signal range.

In setting the representative values D1 and D2, for example, approximately the minimum value and approximately the maximum value in the region of interest or in the extracted signal range are used as the representative values. In another case, the signal values which make the cumulative histogram of the image data in the signal range predetermined values, for example 20% and 80% of the total, respectively are used as the representative values. In another case, the signal value which makes the cumulative histogram of the image data in the signal range, for example, 60% of the total is used as the single representative value. By using the image data in the signal range in determining the representative values D1 and D2, it can be performed a normalization processing more suitable for the subject than the case where the image data in the region of interest are used.

Figure 9:
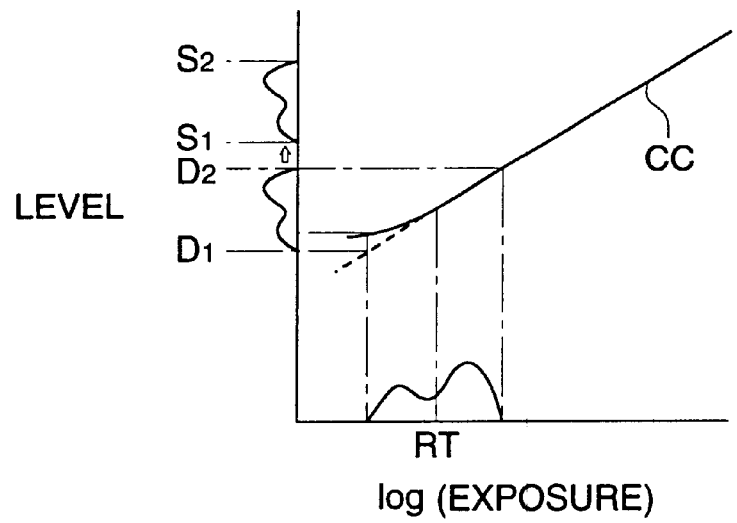
FIG. 9 is a drawing for illustrating level conversion.

When the representative values D1 and D2 are set in this way, the constants "a" and "b" in the equation (2) are determined to have such values as to let the representative values D1 and D2 be desired values S1 and S2 respectively as shown in FIG. 9, and operation is carried out.

Figure 10:
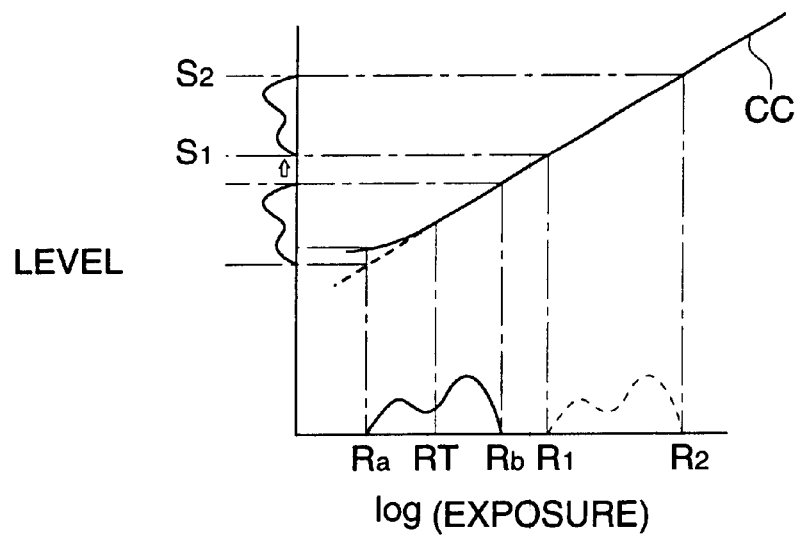
FIG. 10 is a drawing showing normalization processing.

As described in the above, the correction for the influence of the noise characteristics is made utilizing the look-up table for normalization processing, and after that, the setting of the region of interest and the extraction of the signal range are carried out to determine the representative values; then, the conversion of the image data corrected for the influence of the noise characteristics is performed so as to make these representative values be the predetermined values, which completes the normalization processing. By this normalization processing, as shown in FIG. 10, even though the radiation has the range of dose amount Ra to Rb which is lower than the dose range R1 to R2 capable of obtaining the image data having the desired range of standard values S1 to S2, the image data having the standard range of values S1 to S2 can be obtained; hence, the amount of exposure to radiation of a subject can be reduced.

Figure 11:
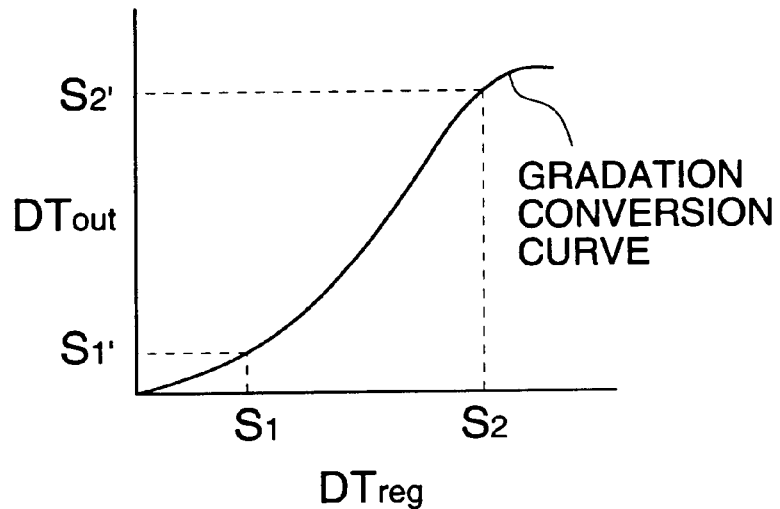
FIG. 11 is a drawing showing a gradation conversion characteristic.

Next, as shown in FIG. 4, gradation processing is executed using the normalized image data DTreg obtained after completion of the normalization processing. In gradation processing, a gradation conversion curve, for example, as shown in FIG. 11 is used and the normalized image data DTreg is converted into the output image data DTout with the standard values S1 and S2 made to be the levels S1' and S2'. These levels S1' and S2' correspond to the predetermined brightness or radiographic density in the output image.

It is desirable that the gradation conversion curve is a continuous function over the whole signal range of the normalized image data DTreg, and it is desirable that its differential function is also continuous. Further, it is desirable that the flag of the differential coefficient is constant over the whole signal range.

Further, because the desirable shape of the gradation conversion curve and the levels S1' and S2' are different depending on the part and position radiographed, the conditions of image acquisition, the method of image acquisition, and so forth, the gradation conversion curve may be appropriately produced at each image acquisition, or as shown in Japanese publicly announced patent H5-26138 for example, a plurality of standard gradation conversion curves are stored beforehand, and by reading out any one of the standard gradation conversion curves and rotating and shifting it, the desired gradation conversion curve can be easily obtained. Besides, in the image processing circuit 26 as shown in FIG. 4, there is provided look-up tables for gradation processing corresponding to a plurality of standard gradation conversion curves, and by correcting the image data, which have been obtained through referring to the look-up table for gradation processing on the basis of the normalized image data DTreg, in accordance with the rotation and shift of the standard gradation conversion curve, the output image data DTout, which have been subjected to the gradation conversion, can be obtained. Besides, in gradation conversion processing, in addition to using two standard values S1 and S2, it is also possible to use a single standard value, or to use three or more standard values.

The selection of the standard gradation conversion curve and the rotation and shift of the standard gradation conversion curve are carried out in accordance with the part and position radiographed, the conditions of image acquisition, the method of image acquisition, and so forth. In the case where these bits of information have been inputted as the control information by using input device 27, by utilizing this control information, the selection of the standard gradation conversion curve can be easily done and at the same time, the angle of rotation and the amount of shift can be determined. Further, the level of the standard values S1 and S2 may be altered in accordance with the part and position radiographed, the conditions of image acquisition, the method of image acquisition, and so forth.

Further, the selection of standard gradation conversion curve and the rotation or shift of the standard gradation corversion curve may be performed also on the basis of the information concerning the kind of the image display unit and the kind of the external apparatus for outputting the image. This is because the desirable gradation may vary depending on the method of outputting the image.

In the following, the frequency enhancing processing and the dynamic range compression-processing will be explained. In the frequency enhancing processing, in order to control the sharpness by the unsharp masking, the function F is determined by the method shown in Japanese publicly announced patents S62-62373 and S62-62376 as follows:

$$Soua = Sorg + F(Sorg - Sus) \quad (3),$$

where Soua is the image data after the processing, Sorg is the image data before the frequency enhancing processing, and Sus is the unsharpened data obtained by averaging the image data before the frequency enhancing processing or by some other method.

Figure 12:
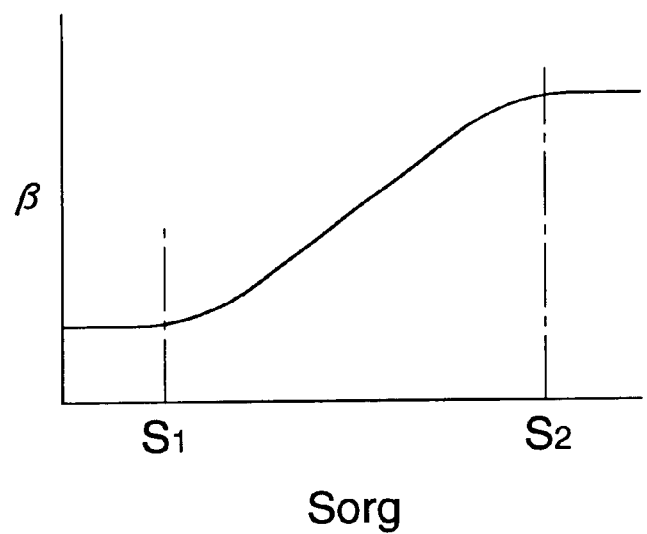
FIG. 12 is a drawing showing an example of the relationship between the emphasis coefficient and the image data.
Figure 13:
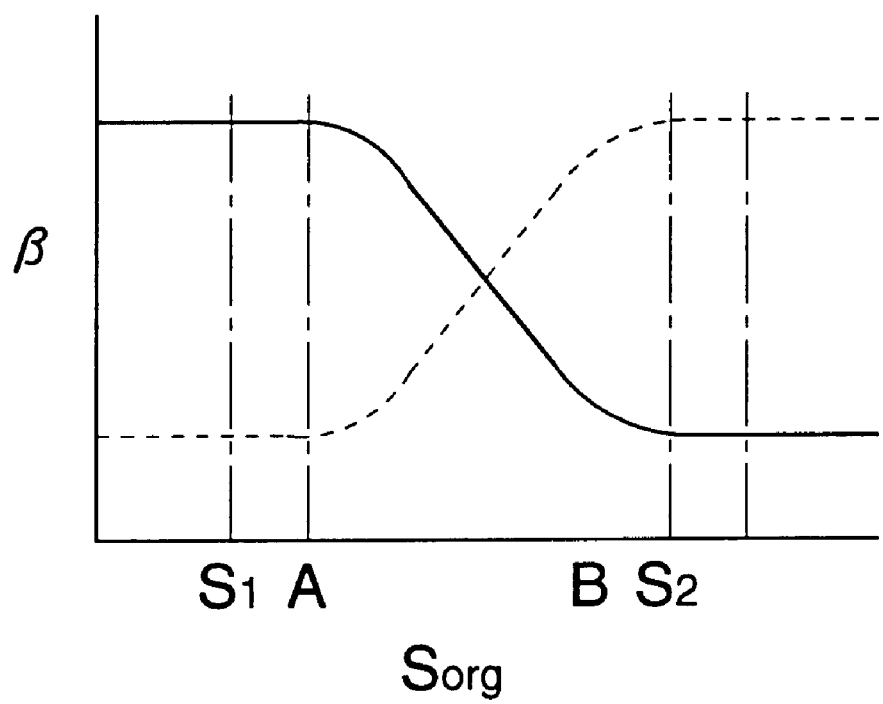
FIG. 13 is a drawing showing another example of the relationship between the emphasis coefficient and the image data.

In this frequency enhancing processing, for example, $F(Sorg-Sus)$ is made to be $\beta \times (Sorg-Sus)$, and $\beta$ (enhancement coefficient) is made to vary approximately linearly between the standard values S1 and S2 as shown in FIG. 12. Further, as shown by the solid line in FIG. 13, in the case where low brightness region is to be enhanced, $\beta$ is made to be maximum in the range from the standard value S1 to the value "A" and to be minimum in the range from the value "B" to the standard value S2; further, $\beta$ is made to vary approximately linearly in the range from the value "A" to the value "B". In the case where high brightness region is to be enhanced, $\beta$ is made to be minimum in the range from the standard value S1 to the value "A" and to be maximum in the range from the value "B" to the standard value S2, as shown by the broken line in FIG. 13; further, $\beta$ is made to vary approximately linearly in the range from the value "A" to the value "B". Besides, although it is not shown in the drawing, in the case where medium brightness region is to be enhanced, $\beta$ is made to be maximum in the range from the value "A" to the value "B". In this way, according to the frequency enhancing processing, the sharpness of arbitrary brightness region can be controlled by the function F.

In the meantime, the standard values S1 and S2 and the values "A" and "B" are obtained by a method similar to the above-mentioned method for determining the standard values S1 and S2 in setting the conditions of the gradation processing. Besides, the method of frequency enhancing processing is not limited to the above-described unsharp masking, but some other method such as the multiple resolution method shown in Japanese laid open patent H9-44645 may be used.

Besides, in the frequency enhancing processing, the frequency range to emphasize and the degree of enhancing is determined in accordance with the part and position radiographed, the conditions of image acquisition, the method of image acquisition, and so forth, as in the selection of the standard gradation conversion curve in the gradation processing etc.

In the dynamic range compression processing, in order to make a control for keeping the data within the density range suitable for observation by the compression processing shown by the equation (4), the function G is determined by the method shown in Japanese Patent No. 266318 as follows:

$$Stb = Sorg + G(Sus) \quad (4),$$

where Stb is the image data after the processing, Sorg is the image data before the dynamic range compression processing, and Sus is the unsharpened data obtained by averaging the image data before the dynamic range compression-processing or by some other method.

Figure 14A:
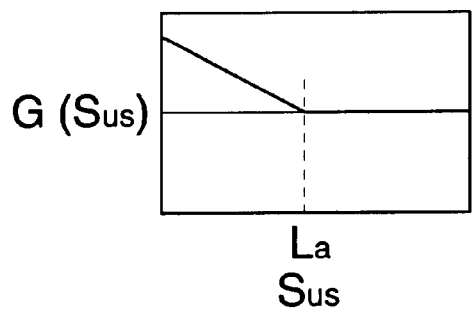
FIGS. 14(*a*) to 14(*e*) are drawings for illustrating dynamic range compression-processing.
Figure 14D:
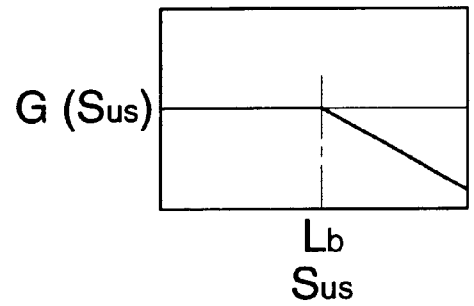
Figure 14B:
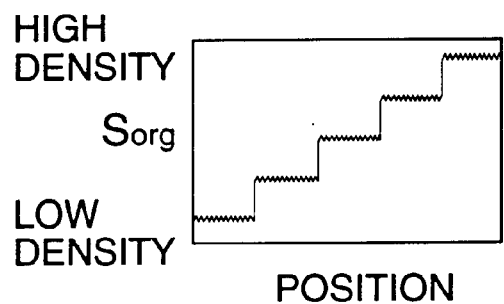
Figure 14E:
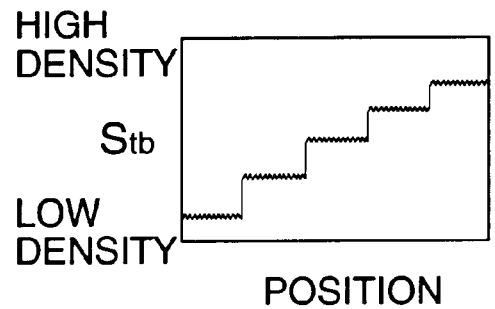
Figure 14C:
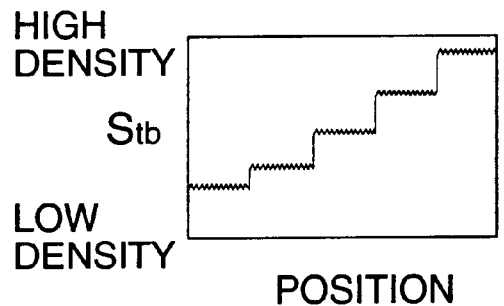

Now, in the case where the function G(Sus) has such a characteristic as to increase in the region where the unsharpened data Sus becomes smaller than the level "La", the density in the low density range is raised, and the image data Sorg shown in FIG. 14B is made to be the image data Stb having the dynamic range in the low density range compressed as shown in FIG. 14C. Further, in the case where the function G(Sus) has such a characteristics as to decrease in the region where the unsharpened data Sus becomes larger than the level "Lb", the density in the high density range is lowered, and the image data Sorg shown in FIG. 14B is made to have the dynamic range in the high density range compressed as shown in FIG. 14E. The levels "La" and "Lb" in the above are obtained by a method similar to the above-mentioned method for determining the standard values S1 and S2 in setting the conditions of the gradation processing.

In addition, in the dynamic range compression processing too, the frequency range to correct and the degree of the correction is determined in accordance with the part and position radiographed, the conditions of image acquisition, the method of image acquisition, and so forth.

Further, in many cases, the noise characteristic of each of a plurality of the image sensing panel 41 is different from others. Therefore, the noise characteristic of each of a plurality of the image sensing panel 41 is stored in the noise characteristic storing means, the noise characteristic is read from the noise characteristic storing means based on the identifying information provided to an image sensing panel 41 so as to identify the image sensing panel 41, then it may be preferable that the normalization processing is conducted by using the read-out noise characteristic. With this processing, an optimum image can be obtained for each image sensing panel 41. Needless to say, the normalization processing look-up table may be provided to each image sensing panel 41.

In this way, according to the above-described embodiment, the image data having the desired level can be obtained by making the correction for the influence of the noise characteristics of the image sensing panel even though the amount of radiation is varied, and the gradation processing is also executed for the image data obtained; hence, a radiation image having a density range and a contrast suitable for diagnosis etc. can always be obtained stably. Moreover, a radiation image having a high sharpness can be obtained by executing frequency enhancing processing, while, by the dynamic range compression-processing, a radiation image being in a density range suitable for observation can be obtained without lowering the contrast of detailed structures of a subject.

According to this invention, the normalization processing is executed to the image signal from the means for detecting a radiation image, and the gradation processing is also carried out to the normalized image signal obtained by the normalization processing; hence, a radiation image having a density range and a contrast suitable for diagnosis etc. can always be obtained stably. Further, a satisfactory radiation image can be obtained even though the amount of radiation is varied, because the normalization processing is done using the information on the noise characteristics peculiar to the means for detecting a radiation image. Moreover, because the conditions of image processing are determined by using the control information on image acquisition, the image processing in accordance with the radiographed radiation image can be simply carried out.

Further, the representative values are determined on the basis of the image signal in the region of interest or in the signal range, and the normalization is done in such a way as to make the representative signal values to be the predetermined signal values; hence, the image of the portion for the subject can be described well.

Furthermore, using the control information on image acquisition, it is performed the selection of the gradation conversion curve, or the preparation of the desired gradation conversion curve by deforming the standard gradation conversion curve selected out of the plural standard gradation conversion curves provided beforehand, and the gradation conversion processing is carried out using the obtained gradation conversion curve; hence, the gradation processing in accordance with the radiographed radiation image can be carried out simply.

Besides, by performing the frequency enhancing processing and the dynamic range compression-processing, a radiation image having a high sharpness and a density range suitable for observation can be obtained.

Next, an image processing apparatus of this invention capable of carrying out image processing such as a gradation processing for a read out radiation image at a high speed will be explained.

That is, in recent years, an apparatus capable of obtaining a radiation image as a moving image has been studied; in such an apparatus, it is required that the degree of the diffusion of the contrast medium injected into a vein or a digestive organ etc. is displayed in real time. Further, in order to obtain a radiation image as a moving image and also to display a moving image suitable for diagnosis etc., the image data of the whole radiation image should be obtained at a high speed, and at the same time, it is necessary to carry out the image processing as mentioned above such as the gradation processing at a high speed.

As described above, it has been practiced a method of radiographing such that an irradiation field by a radiation for a subject is limited by placing a lead plate at a part of the subject, or by providing a diaphragm controller in the radiation generating unit; in this case, in order to obtain a radiation image suitable for diagnosis, it is necessary to detect the irradiation field, and to use the image data in the irradiation field. For this reason, as mentioned in the foregoing, in Japanese laid open patent S63-259538, it is disclosed a technology such that edge points of an irradiation field are obtained on the scanning lines drawn radiately from a predetermined point in the irradiation field, and the figure formed by connecting the obtained edge points is made to be the irradiation field. However, according to this technology, because the image data of the whole radiation image is required in order to obtain the edge point, the detection processing can not be carried out until the image data are completely obtained; therefore, there is a problem that it takes time to detect the irradiation field, and image processing can not be carried out at a high speed.

Figure 15:
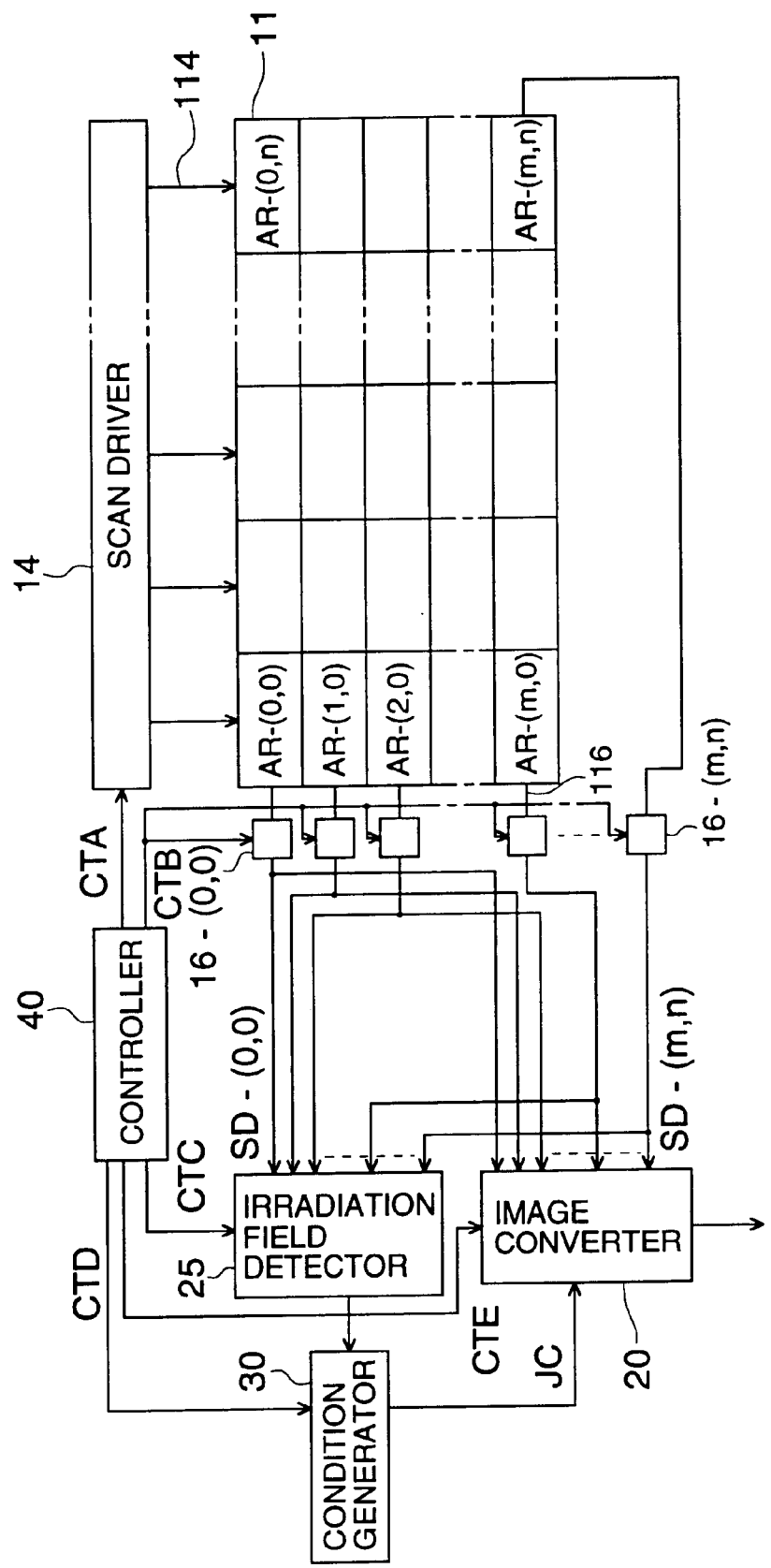
FIG. 15 is a drawing showing the structure of an apparatus for detecting an irradiated field.
Figure 16:
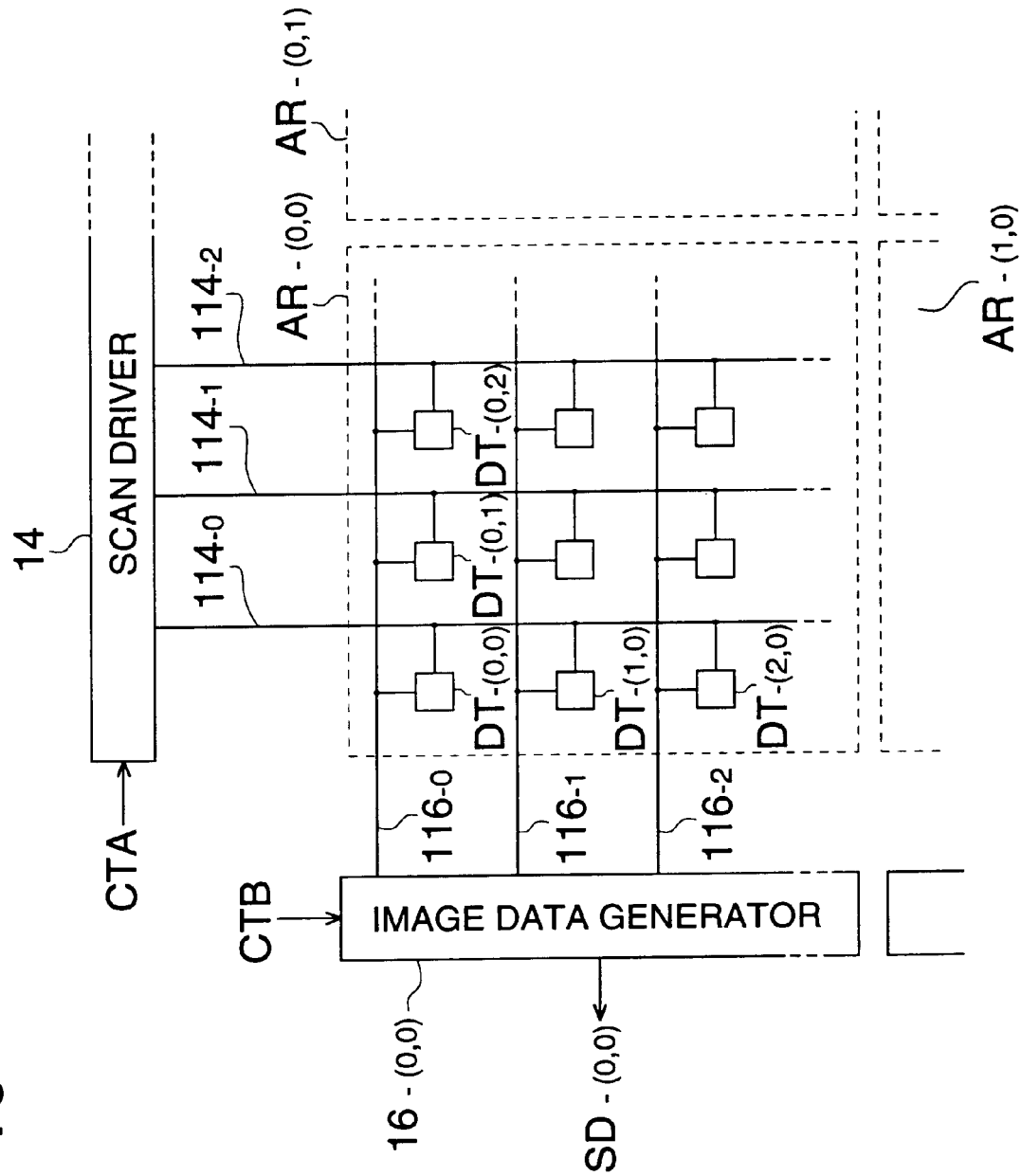
FIG. 16 is a drawing showing the block AR-(0, 0)
Figure 17:
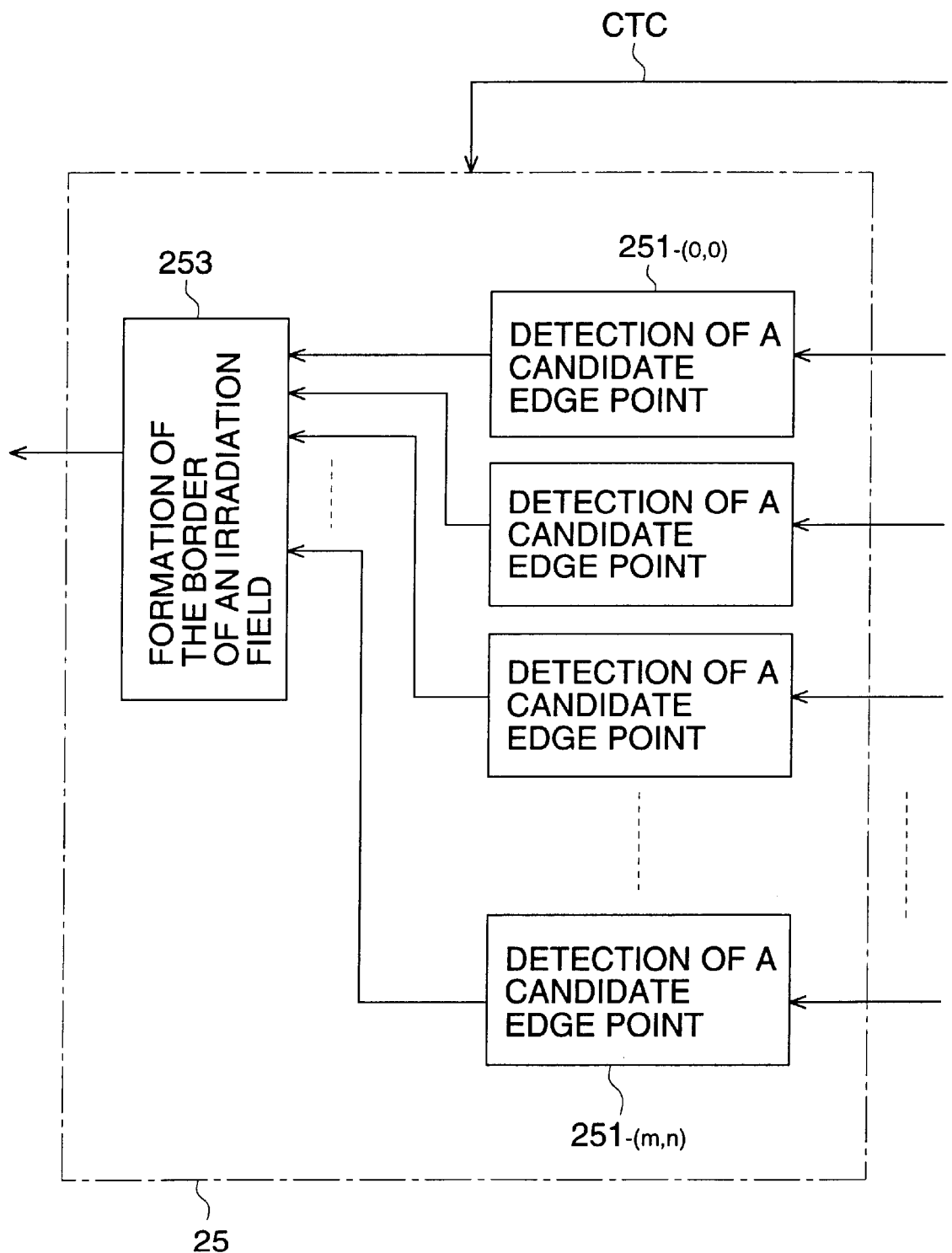
FIG. 17 is a drawing the structure of the irradiation field outputting portion.

FIG. 15 to FIG. 17 are block diagrams showing the structure of an apparatus for detecting an irradiation field of this invention solving this problem and capable of detecting an irradiation field at a high speed.

In the apparatus for detecting an irradiation field of this invention, the area A of the detector 11 is divided into a plurality of blocks AR-(0, 0) to AR-(m, n) as shown in FIG. 15. In one block, for example, in the block AR-(0, 0), the detecting elements DT(O, 0) to DT(j, k) are arranged two-dimensionally, while the scan lines 114-0 to 114-k and the signal lines 116-0 to 116-j are arranged, for example, in the orthogonal manner.

The scan lines 114-0 to 114-k are connected to the scan driver 14, in which the readout signal RS is generated on the basis of the control signal CTA supplied from the controller 40 to be described later, and the readout signal RS is outputted to the scan line 114-p (p being any one of the values from 0 to k), one of the scan lines 114-0 to 114-k. By this readout signal RS, the electrical signals SV-0 to SV-j corresponding to the amount of the radiation applied are outputted from the detecting elements DT(O, p) to DT(j, p), and supplied to the image data generator 16-(0, 0) through the signal lines 116-0 to 116-j.

In other blocks AR-(0, 1) to AR-(0,n), AR-(1, 0) to AR-(1, n), - - - , AR-(m, n) also, in the same way as the block AR(0, 0), by the readout signal RS from the scan driving circuit 14, the electrical signals SV corresponding to the amount of the radiation applied are outputted from the (j×k) detecting elements in the respective blocks, and are supplied to the image data generators 16-(0, 1) to 16(0, n), 16-(1, 0) to 16(1, n), - - - , 16-(m, n) corresponding to the respective blocks.

In addition, if the scan lines 114-0 to 114-k used in the block AR-(0, 0) are used also in other blocks in the same way as in the block AR-(0, 0), the electrical signals SV are easily outputted at the same timing from the detecting elements, for example having the same column number, of the respective blocks.

In the image data generator 16-(0, 0), the supplied electrical signals SV-0 to SV-j are converted into the digital image data on the basis of the control signal CTB supplied from the controller 40, and stored in the memory (not shown in the drawing) of the image data generator 16-(0, 0) as the image data SD-(0, 0). Further, in the same way, also in the image data generators 16-(0, 1) to 16-(0, n), 16-(1, 0) to 16-(1, n), - - - , 16-(m, n), the image data SD-(0, 1) to SD-(0, n), SD-(1, 0) to SD-(1, n), - - - , SD-(m, n) are stored in the memories of the respective image data generators 16. Further, the image data SD stored in the image generators 16 are read out on the basis of the control signal CTB, and supplied to the irradiation field detector 25 and to the image converter 35 shown in FIG. 15.

FIG. 17 shows the structure of the irradiation field detector 25. The image data SD-(0, 0) supplied from the image data generator 16-(0, 0) are supplied to the circuit for detecting candidate edge points of an irradiation field 251-(0, 0). In the same way, the image data SD-(0, 1), - - - , SD-(m, n) are supplied to the circuits for detecting candidate edge points 251-(0, 1), - - - , 251-(m, n).

In the circuit for detecting candidate edge points 251-(0, 0), the detection of the candidate edge points is carried out using the image data SD-(0, 0). For example, the values of difference between the adjacent pixels are calculated and the position at which the absolute value of the difference value is larger than the predetermined threshold value is made to be the candidate edge points. Further, the detection of candidate edge points is not limited to the case where the difference values are used, but, it may be used, for example, a method such that the respective blocks are further divided into several small regions to calculate the value of the variance in the divided regions, and an arbitrary pixel included in the small area where the value of the variance becomes the maximum is made to be the candidate edge points.

When a candidate edge point is detected in the circuit for detecting candidate edge points 251-(0, 0), the position information indicating the position of this candidate edge point is supplied to the circuit for forming the border of an irradiation field 253. Further, the block information indicating in which block this candidate edge point is detected is also supplied to the circuit for forming the border of an irradiation field 253. In the same way, in other circuits for detecting candidate edge points 251, the detection of a candidate edge point is carried out, and when a candidate edge point is detected, the position information of the candidate edge points and the block information are supplied to the circuit for forming the border of an irradiation field 253.

In the circuit for forming the border of an irradiation field 253, the position information and the block information from the circuit for detecting candidate edge points 251 in which a candidate edge point has been detected are temporarily stored in the memory of the circuit for forming the border of an irradiation field. In addition, the position information and the block information are stored in the predetermined site of the memory on the basis of the position of the block.

Next, it is judged in which block the candidate edge points has been detected by utilizing the block information, and the candidate edge points of the two adjacent blocks, for which it has been judged that a candidate edge point has been detected, are connected by a straight line. When the two candidate edge points have been connected by a straight line, one of the candidate edge points connected by the straight line and the candidate edge points of a new block adjacent to the block of the above-mentioned candidate edge points, in which the candidate edge points has been detected, are connected by a straight line. In the same way, candidate edge points of the adjacent blocks are successively connected by a straight line one after another.

In this way, the candidate edge points are successively connected by straight lines, and this area surrounded by the straight lines is recognized as the irradiation field. The irradiation field information indicating the area of this irradiation field is supplied to the condition generator 30 shown in FIG. 15. Further, the operation of the irradiation field detector 25 is controlled on the basis of the control signal CTC from the controller 40.

In the condition generator 30, using the image data in the irradiation field indicated on the basis of the irradiation field information from the circuit for forming the border of an irradiation field 253, the conditions for image processing of a radiation image for obtaining a radiation image suitable for diagnosis etc. are determined, and the condition setting signal JC indicating these conditions for image processing is supplied to the image converter 35.

In the image converter 35, it is executed on the conditions based on the condition setting signal JC the image processing of the radiation image based on the image data supplied from the image generator 16, for example, the gradation processing for obtaining a radiation image having a density range and a contrast suitable for diagnosis etc., the frequency enhancing processing for controlling the sharpness, the dynamic range compression processing for keeping the whole radiation image having a wide dynamic range within a density range suitable for observation without lowering the contrast of the portion of the detailed structure of the subject, and so forth.

Besides, the operation of the condition generator 30 and the image converter 35 are controlled on the basis of the control signals CTD and CTE from the controller 40.

In the controller 40, the control signals CTA to CTE are generated and supplied to the respective portions as mentioned above, in order that a good radiation image suitable for diagnosis etc. may be obtained.

Figure 18:
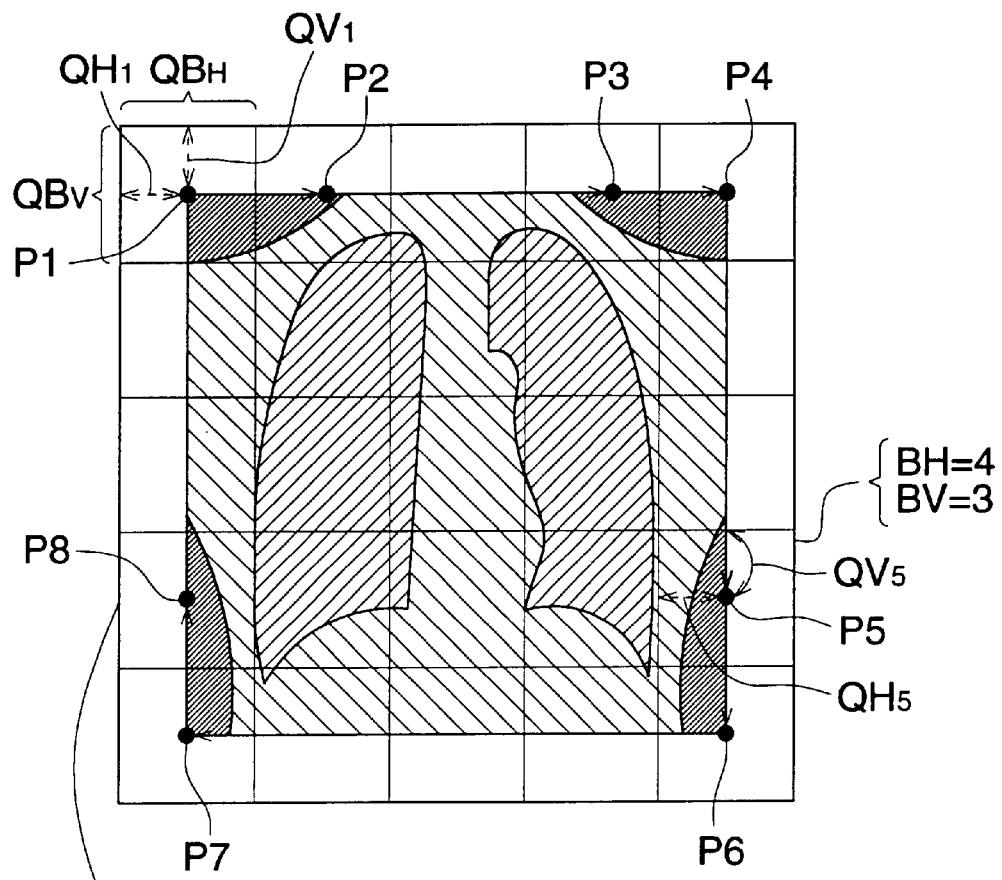
FIGS. 18(*a*) and 18(*b*) are drawings for illustrating the operation of the apparatus for detecting an irradiation field.
Figure 18:
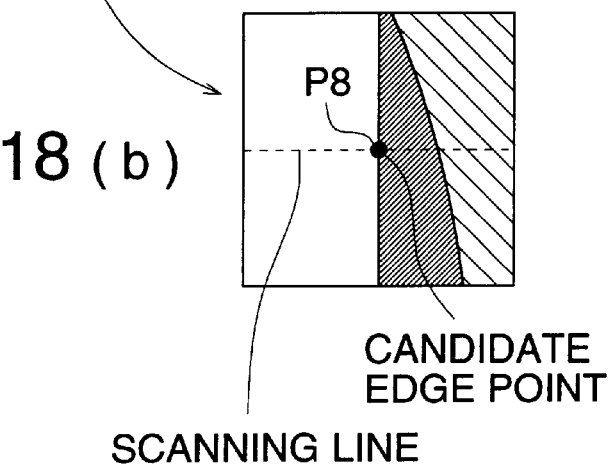

In the following, the operation will be explained. The area AR of the detector 11 is divided, for example, into 25 areas from AR-(0, 0) to AR-(5, 5) as shown in FIG. 18A. Now, when the application of radiation is completed, the output of electrical signals from the detecting elements of the respective blocks is made by the readout control signal RC from the controller 40, and the image data of the respective blocks are stored in the memories of the respective image data generators 16. For example, the image data of the area AR-(0, 0) are stored in the memory of the image data generator 16-(0, 0), while the image data of the area AR-(0, 1) are stored in the memory of the image data generator 16-(0, 1).

Next, the image data stored in the respective image data generators 16 are read out on the basis of the control signal CTB from the controller 40, and supplied to the circuit for detecting candidate edge points of the irradiation field detector 25 and the image data converter 35.

In the circuit for detecting candidate edge points, as shown in FIG. 18B, scanning is made, for example, along a line on the middle point of the longitudinal width of a block in the horizontal direction, and the difference values of the image data between the adjacent pixels on the scanning line are calculated. Now, the absolute values of the difference values are calculated and if the maximum value of the absolute values obtained is larger than the threshold value, the detected point of the maximum value is made to be a candidate edge point. In addition, the number of scanning lines is not limited to one for each block as shown in FIG. 18B, and a plurality of candidate edge points can be obtained by a plurality of scans for each block.

Now, let (QH, QV) be the co-ordinates in the respective blocks with regard to the upper-left corner of each block, "QBH" x "QBV" be the matrix size of each block, and the upper-left corner of the area AR-(0, 0) be the basis of the pixel co-ordinates, then the pixel co-ordinates (PH, PV) of the detected candidate edge points P1 to P8 are obtained by the equation (5):

$$(PH, PV)=(QH+QBH \times BH, QV+QBV \times BV) \qquad (5),$$

where "BH" and "BV" stand for the site numbers indicating the positions of the blocks when the block AR-(0, 0) is made the basis. Accordingly, in the case of the candidate edge point P1, for example, if the co-ordinates in the block are made to be (QH1, QV1), it will be given that PH=QH1, and PV=QV1, because BH=BV=0. Further, in the case of the candidate edge point P5, if the co-ordinates in the block are let to be (QH5, QV5), it will be given that PH=QH5+3×QBH, and PV=QV5+4×QBV, because BH=3, and BV=4. Furthermore, when a candidate edge point is detected, the block information is supplied to the circuit for forming the border of an irradiation field.

Besides, the method of indicating the position of the blocks is not limited to the one having the upper-left corner made as the basis, but, for example, the center of the image can be made as the basis. Further, the position may be indicated not only by the Cartesian co-ordinates but also by the polar co-ordinates. In this case, by deforming the equation (5) in accordance with the polar co-ordinate representation, the relative relationship for the positions of the respective candidate edge points can be represented correctly.

In this way, when the positions of the candidate edge points are obtained, this position information, together with the block information, is stored at the predetermined site in the memory of the circuit for forming the border of an irradiation field 252. Now, utilizing the block information stored in the memory, for example, it is discriminated the block of which the candidate edge points which is the nearest to the upper-left corner has been detected. Letting this discriminated block be the starting block, the candidate edge points of this block is let to be P1 as shown in FIG. 18A. Next, the candidate edge points of the block which is the nearest to the block of the candidate edge point P1 is let to be P2, and the straight line connecting these candidate edge points P1 and P2 is let to be a line for forming the border and stored in the memory. In addition, by storing the tilt and the intercept of the straight line in the memory, it can be stored with a small capacity in the memory.

Next, the candidate edge points of the block which is the nearest to the block of the candidate edge point P2 is let to be P3, and the straight line connecting these candidate edge points P2 and P3 is let to be a line for the candidate edge points and stored in the memory. Successive operations are carried out in the same way, until the last candidate edge point P8 is connected to the candidate edge point P1 of the starting block.

Figure 19:
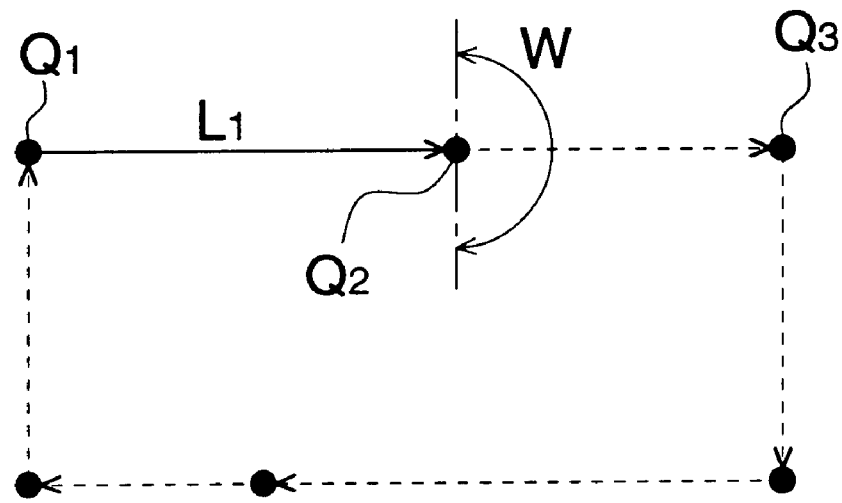
FIG. 19 is a drawing for illustrating a method of connecting the candidate edge points.

In addition, regarding the connecting of two candidate edge points, it is not limited to the case where the nearest block is detected and the candidate edge points of this detected block is connected by a straight line. For example, because it is often the case that the diaphragm has a rectangular shape, as shown in FIG. 19, with regard to the direction of the straight line connecting the candidate edge points Q1 and Q2, the candidate edge points which is within the predetermined range W from the candidate edge point Q2 and at the same time is the nearest one is detected, and the detected candidate edge point Q3 is connected by a straight line. The next candidate edge point is detected in the same way from the candidate edge point Q3 and is connected by a straight line; in the same way, each successive candidate edge points can be connected to the former candidate edge point by a straight line. Further, it may be appropriate that candidate edge points are selected on the basis of the amount of variation of the co-ordinates of the candidate edge points, and connected by a straight line successively.

In this way, the area which is surrounded by the straight lines connecting the candidate edge points, that is, the lines for the candidate edge points is made to be the irradiation field, and the irradiation field information indicating this area of the irradiation field is supplied to the condition generator 30.

As described in the above, because, in a parallel manner from the respective blocks, the image data are generated and the candidate edge points are detected, the irradiation field can be recognized at a high speed by connecting these candidate edge points by straight lines. Further, owing to the high-speed recognition of the irradiation field, by determining the conditions of image processing in the condition generator 30 using the image data in the irradiation field, and executing the image processing for the radiation image on the basis of this determined conditions of the image processing in the image converter 35, a radiation image suitable for diagnosis etc. can be obtained at a high speed.

Further, in the above-described embodiment, the conditions of image processing are determined by supplying the irradiation field data to the condition generator 30, however, it may be also appropriate that by providing a checker it is executed the check whether the irradiation field data is correct or not, and the conditions of image processing are determined on the basis of the irradiation field data which has been judged as correct. In this case, in the checker, the representative values of the obtained irradiation field, for example, the mean value and the median of the image data included in the irradiation field, or the signal values for making the cumulative histogram to be the predetermined percent values and the area of the histogram etc. are obtained, and the judge is made by it whether these values satisfy the predetermined conditions or not.

Further, if the readout signals RS are outputted successively to any one of the scan lines connected to the blocks AR-(0, 0), AR-(0, 1) to AR-(0, n), it is necessary to provide only one image generator for the blocks AR-(0, 0), AR-(0, 1) to AR-(0, n). Accordingly, by making other blocks have the same structure, the image data for one field of image can be generated in m image generators and the structure can also be simplified.

As mentioned in the foregoing, the apparatus for detecting an irradiation field of this invention comprises means for detecting a radiation image which detects the exposure to a subject with the diaphragm limited by a plurality of detecting elements arranged two-dimensionally, and generates the image data of the radiation image, means for obtaining image data which divides the radiation image into a plurality of blocks and reads out the image data of the respective blocks from said means for detecting a radiation image in a parallel manner, means for storing the position of blocks which stores the positions of the respective blocks on the image, means for detecting a candidate edge point which detects one or a plurality of candidate edge points being considered as positioned on a border of an irradiation field for each of the blocks, on the basis of the image data of the respective blocks read out from said means for detecting a radiation image by said means for obtaining image data, and means for forming the border of an irradiation field which forms it as the border of an irradiation field the figure formed by connecting the candidate edge points detected by said means for detecting a candidate edge point, and detects the area surrounded by the border of an irradiation field as the area of the irradiation field.

According to this invention, the recognition of an irradiation field which is required for executing a suitable image processing can be made at a high speed.

In the following, another image processing apparatus of this invention capable of carrying out image processing for a read out radiation image at a high speed will be explained.

FIG. 20 to FIG. 24 are block diagrams showing the structure of a high-speed image processing apparatus of this invention.

Figure 20:
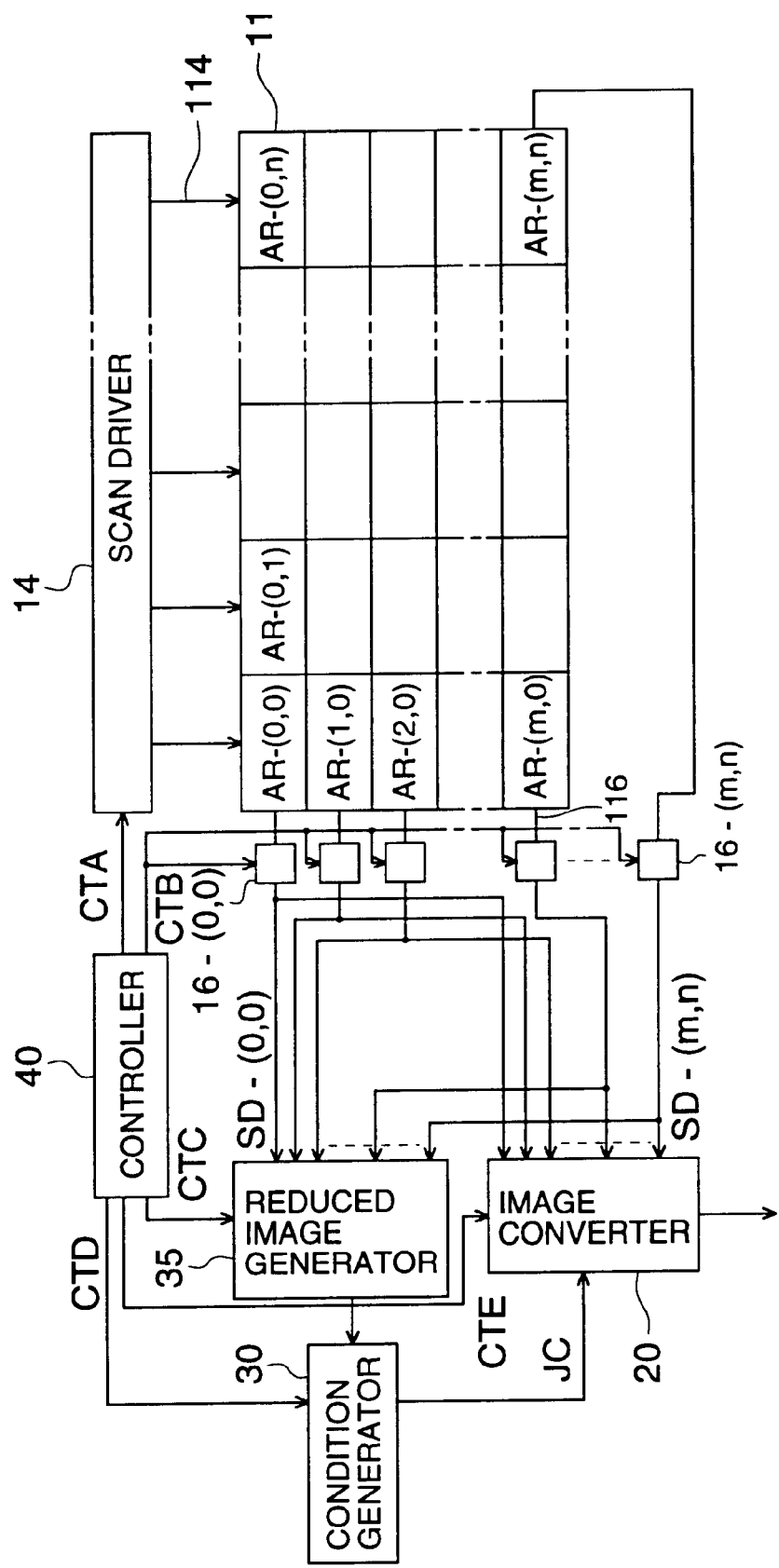
FIG. 20 is a drawing showing the structure of an image processing apparatus.

In the high-speed image processing apparatus of this invention, the area A of the detector 11, as shown in FIG. 20 in the same way as in FIG. 15 and FIG. 16, is divided into a plurality of blocks AR-(0, 0) to AR-(m, n).

The image data SD which have been stored in the image data generators 16 by the structure as explained in FIG. 15 and FIG. 16 are read out on the basis of the control signal CTB, and supplied to the reduced image generator 35 and to the image converter 20 shown in FIG. 20. In the present embodiment, the image data obtaining means is structured by the image data generators 16 and the image converter 20 to unify the data obtained from each image data generator. This image data obtaining means can be incorporated in the image data generating circuit 46 in the embodiment shown in FIG. 2(a).

Figure 21:
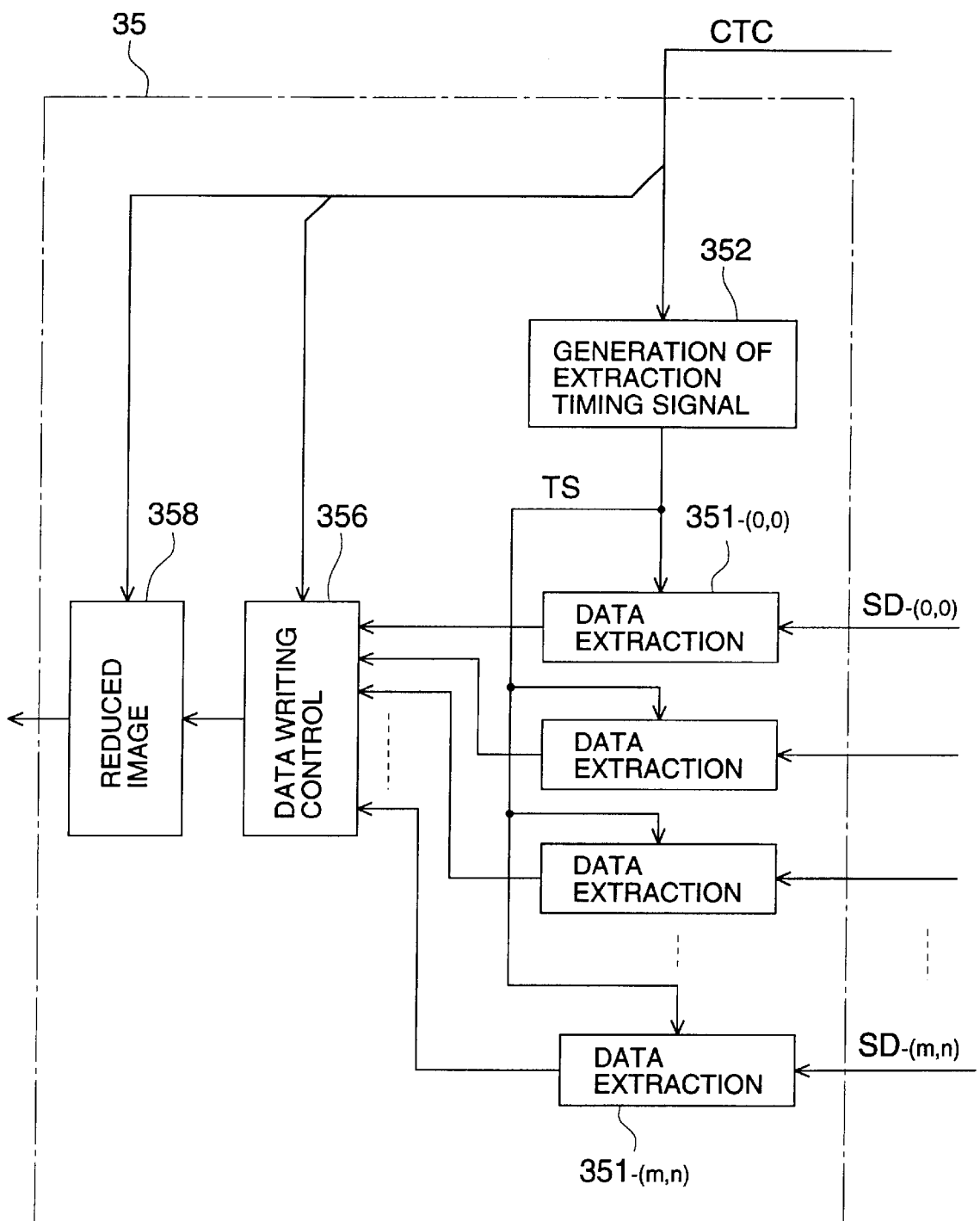
FIG. 21 is a drawing showing a structure of the reduced image outputting portion.

FIG. 21 shows the structure of the reduced image generator 35. This reduced image generator 35 can be incorporated in the image data generating circuit 46 in the embodiment shown in FIG. 2(a). The image data SD-(0, 0) supplied from the image data generator 16-(0, 0) are supplied to the data extracting circuit 351-(0, 0). In the same way, the image data SD-(0, 1), - - - , SD-(m, n) are supplied to the image extracting circuits 351-(0, 1), - - - , 351-(m, n) respectively.

In the circuit for generating an extraction timing signal 352, the number of the image data (the matrix size) supplied from the image data generators 16 is judged on the basis of the control signal CTC from the controller, and when it reaches to the predetermined number of the data, the extraction timing signal TS is generated and supplied to the data extracting circuits 351-(0, 0), - - - , 351-(m, n).

In the data extracting circuit 351-(0, 0), the image data of one pixel is extracted from the supplied image data SD-(0, 0) on the basis of this extraction timing signal TS, and supplied to the controlling circuit for writing data 356. In the same way, in other data extracting circuits 351 also, the image data of one pixel are extracted and supplied to the controlling circuit for writing data 356.

Figure 22:
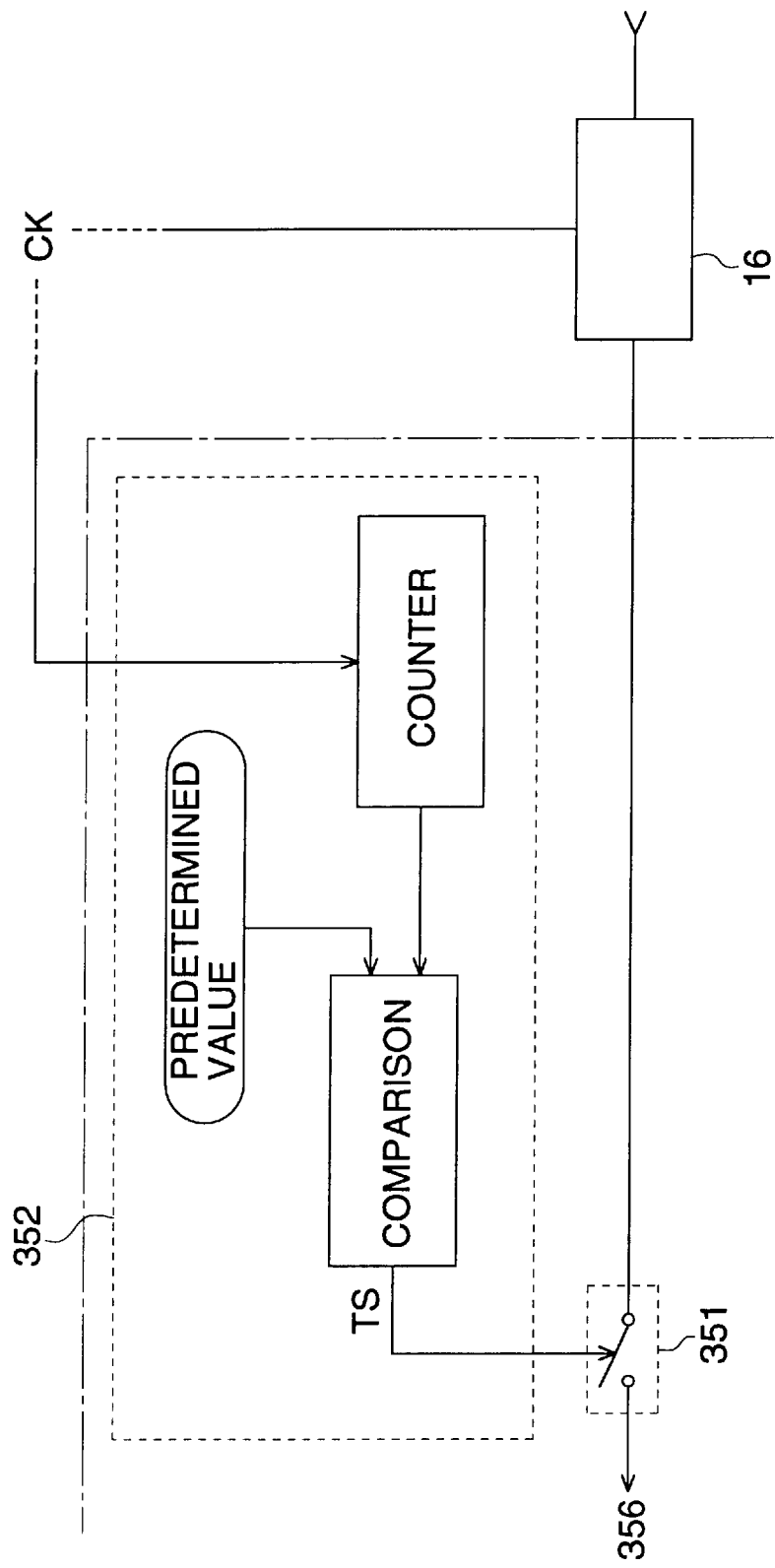
FIG. 22 is a drawing for illustrating the operations of the circuit for generating an extraction timing signal and the data extracting circuit.

As shown in FIG. 22 for example, in the image data generators 16, the image data are read out at the predetermined clock frequency CK on the basis of the control signal CTB. In the circuit for generating an extraction timing signal 352, counting is started from the start of reading out of the image data in the image data generators 16 at the predetermined clock frequency CK on the basis of the control signal CTC. Now, when the count value reaches to the predetermined value, that is, the number of the image data that have been read out reaches to the predetermined number of data, the image data of one pixel are supplied to the controlling circuit for writing data 356 by closing a switch.

In the controlling circuit for writing data 356, it is judged from which block AR the image data, which have been extracted in the data extracting circuits 351-(0, 0), - - - , 351-(m, n), are extracted, and the data writing site of the memory for the reduced image 358 is determined on the basis of the position of the discriminated block AR. That is, in the memory for the reduced image 358, the image data of the reduced image (hereinafter referred to as "the reduced image data") obtained by subsampling the image data are written. Further, the operation of the controlling circuit for writing data and the reading out of the reduced image data written in the memory for the reduced image 358 are controlled by the control signal CTC.

Besides, it may be appropriate that, in the circuit for generating an extraction timing signal 352, the extraction timing signal TS is generated when the number of the data has reached to the first level and to the second level, and the image data of several pixels are extracted in the respective data extraction circuits 351.

Further, it has been explained in the above that, in the reduced image generator 35, the image data of one pixel or a several pixels are to be extracted; however, by calculating the representative values, it is also possible to write these representative values in the memory for the reduced image 358.

Figure 23:
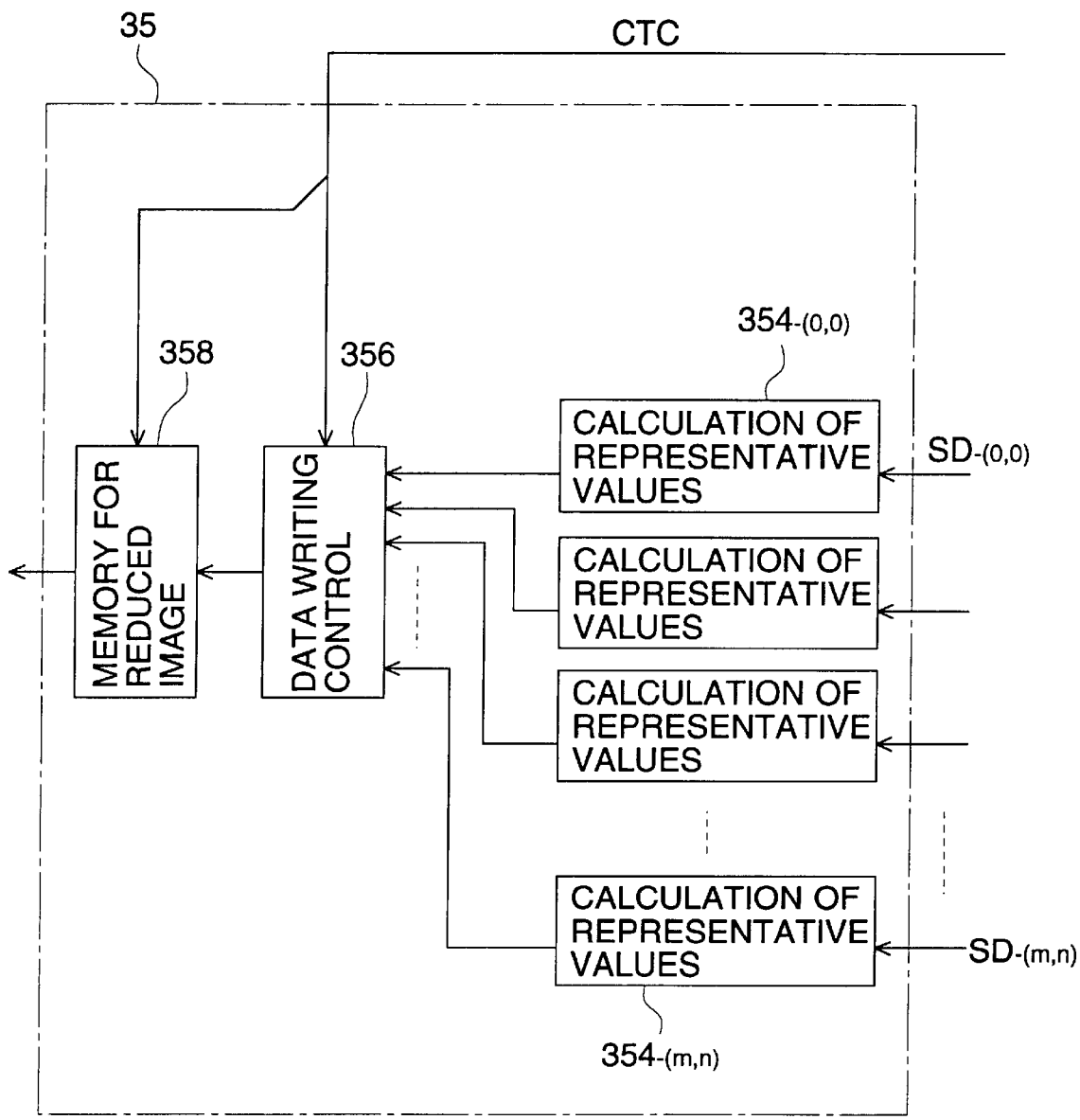
FIG. 23 is a drawing showing another structure of the reduced image output portion.

FIG. 23 shows the structure of the reduced image generator 35 which obtains the representative values of the respective blocks and writes these representative values in the memory for the reduced image 358. In this FIG. 23, the image data SD-(0, 0), which have been outputted from the image data generator 16-(0, 0), are supplied to the circuit for calculating representative values 354-(0, 0). In the same manner, the image data SD-(0, 1), - - - , SD-(m, n) are supplied to the circuits for calculating representative values 354-(0, 1), - - - , 354-(m, n) respectively.

In the circuit for calculating representative values 354-(0, 0), the representative value data for the image data of one block SD-(0, 0) are calculated and supplied to the controlling circuit for writing data 356. As for these representative value data, for example, the mean value, the median value, the maximum value, the minimum value, the value of the variance, etc. can be used. In the same way, in other circuits for calculating representative values 354, the representative value data are calculated and supplied to the controlling circuit for writing data 356.

In the controlling circuit for writing data 356, it is judged to which block the respective representative value data that have been calculated in the circuits for calculating representative values 354-(0, 0), - - - , 354-(m, n) belong, and the data writing sites in the memory for the reduced image 358 are determined. That is, in the same way as in the above-described case, the reduced image data are written in the memory for the reduced image 358.

The reduced image data, which have been written in the memory for the reduced image data 358 in this way, are read out on the basis of the control signal CTC, and supplied to the condition generator 30 shown in FIG. 20.

In the condition generator 30, the conditions for image processing for obtaining a radiation image suitable for diagnosis etc. are determined on the basis of the control signal CTD from the controller 40, by using the reduced image data from the reduced image generator 35, and the condition setting signal JC indicating these conditions for image processing is supplied to the image converter 20.

In the image converter 20, on the conditions for image processing based on the condition setting signal JC, it is executed the image processing to the image data supplied from the image data generators 16, for example, the gradation processing for obtaining a radiation image having a density range and a contrast suitable for diagnosis etc., the frequency enhancing processing for controlling sharpness, the dynamic range compression processing for keeping the image data within a density range suitable for observation without lowering the contrast of the detailed structure of the subject, and so forth.

Further, the operation of the condition generator 30 and the image converter 20 are controlled on the basis of the control signals CTD and CTE from the controller 40.

In the controller 40, in order that a good radiation image suitable for diagnosis. may be obtained, the control signals CTA to CTE are generated and supplied to the respective portions as described in the above.

Figure 24:
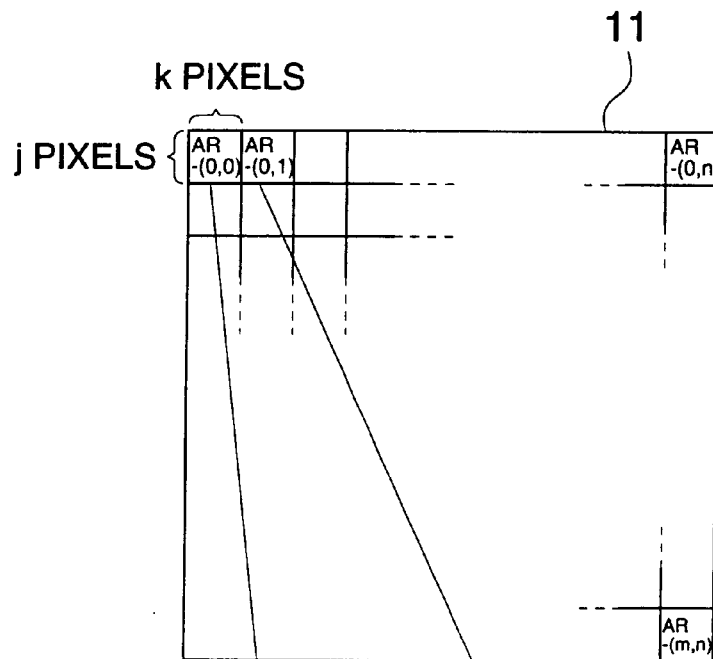
FIGS. 24(a) to 24(c) are drawings for illustrating the operation of the image processing apparatus.
Figure 24:
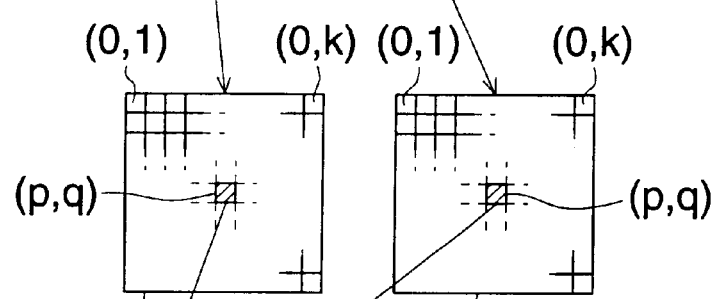
Figure 24:
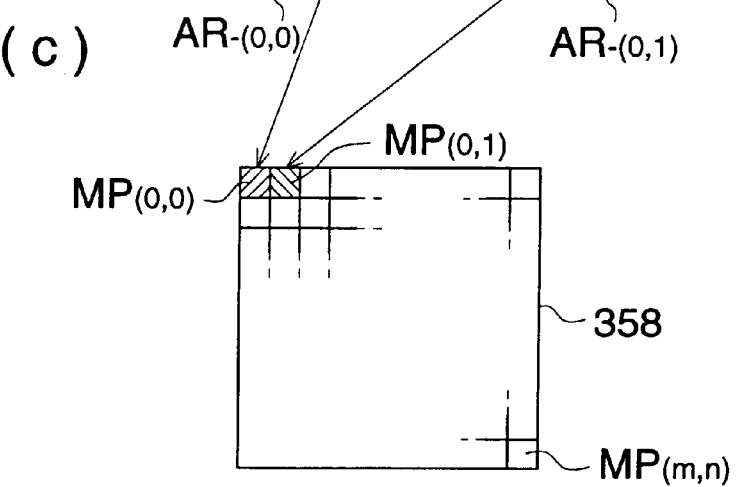

In the following, the operation will be explained with reference to FIG. 24. The area AR of the detector 11 is divided into, for example, the blocks having "j"בk" pixels per each as shown in FIG. 24A. Now, when the exposure of radiation is completed, the output of the electrical signals from the respective elements is made by the readout control signal RC from the controller 40, and the image data of the respective blocks are stored in the memories of the respective image data generators 16. As shown in FIG. 24B for example, the image data of the block AR-(0, 0) are stored in the memory of the image data generator 16-(0, 0), and the image data of the block AR-(0, 1) are stored in the memory of the image data generator 16-(0, 1).

Next, the image data stored in the memories of the respective image data generators 16 are read out and supplied to the reduced image generator 35 and to the image converter 20.

In the reduced image generator 35, the number of the image data are counted, and when it reaches to the predetermined number of data, that is, if the number reaches to the predetermined number when the image data, for example, of the pixel site (p, q) in the block are read out, the image data of this pixel site (p, q) are extracted. Now, supposing that the extracted image data are the image data supplied from the image data generator 16-(0, 0), these image data supplied from the image data generator 16-(0, 0) are the image data of the block AR-(0, 0) at the upper-left corner as shown in FIG. 24A. For this reason, the extracted image data are written in the site MP(0, 0) at the upper-left corner of the memory for the reduced image 358. Further, in the case where the extracted image data are the image data supplied from the image data generator 16-(0, 1), the image data supplied from the image data generator 16-(0, 1) are written in the site MP(0, 1) adjacent to the right side of the site MP(0, 0) of the memory for the reduced image data, because they are the image data of the block AR-(0, 1) which are adjacent to the right side of the block AR-(0, 0). The successive extracted image data are written, in the same way, in the memory 358 for the reduced image in accordance with their respective block positions. Accordingly, in the memory for the reduced image, there are stored the image data of the reduced image in which "j"בk" pixels are reduced in one pixel. Further, as described in the foregoing, it may be appropriate to extract the image data of several pixels per each block out of the image data read out from the image data generators 16, or to obtain the representative values from the image data for one block, that is, "j"בk" pixels, and to write them in the memory for the reduced image.

In this way, the conditions for image processing are calculated in the condition generator 30 by using the image data written in the memory 358 for the reduced image. In this case, in order to perform image processing suitably, the matrix size should be made large by making the size of a pixel small so that the reduced image may have the characteristics of the original image. On the other hand, in order to obtain the conditions for processing in a short time, it is desirable to reduce the matrix size by making the size of a pixel large as we can. Accordingly, it is desirable to make the size of a pixel in the reduced image to be in the range of 1 mm to 5 mm; for example, in the case where the size of an original pixel is in the range of 100 μm to 200 μm, if the size of a pixel in the reduced image is made to be 1 mm×1 mm, one block is to be made up of 5×5 pixels to 10×10 pixels. Further, if the size of a pixel in the reduced image is made to be 5 mm×5 mm, one block is to be made up of 25×25 to 50×50 pixels. From the image data in this block, the image data for one pixel in the reduced image are generated.

In the condition generator 30, the reduced image maintains the characteristics of the original image and has small matrix size compared with that of original image, so the conditions for image processing can be calculated more rapidly than in the case using the original image by using the reduced image data, because the amount of data to be processed can be reduced; further, in the image converter 20, a radiation image suitable for diagnosis can be obtained through carrying out image processing for the radiation image in a short time.

Further, by storing the image data of the reduced image and the image data of the original image in a recording medium, in the case where image processing has to be performed again, for the reasons that, for example, a different processing should be done or the conditions which have been once obtained were not optimum, it is not required to obtain the reduced image again, and accordingly the different processing can be carried out rapidly; moreover, the conditions for image processing can be rapidly obtained again and new conditions for image processing also can be obtained rapidly by altering the parameters in calculating the conditions for image processing, and also a radiation image which should be subjected to the image processing on the various conditions for image processing can be rapidly obtained accordingly. Besides, by storing also the conditions for image processing which have been once obtained, by using these conditions for image processing, regarding the radiation image for which image processing has once been performed, the image output after image processing can be obtained rapidly.

In addition, in the above-described embodiment, the image data generators 16 are provided corresponding to the blocks AR-(0, 0) to AR-(m, n) respectively; however, if the readout signal RS is outputted sequentially to the scan lines connected to the blocks AR-(0, 0), AR-(0, 1) to AR-(0,n) respectively, it is necessary to provide only one image generator for the blocks AR-(0, 0), AR-(0, 1) to AR-(0,n). Accordingly, by making other blocks have the same structure, the image data for one field of image can be generated in m image generators and the structure can also be simplified.

As has been explained up to now, the image processing apparatus of this invention comprises means for detecting a radiation image which detects the exposure and detects a radiation image by generating an electrical signal corresponding to the detected exposure, means for obtaining image data which divides the radiation image into a plurality of blocks and reads out electrical signals from said means for detecting a radiation image in a parallel manner for the respective blocks to generate image data, and means for forming a reduced image which extracts image data at a predetermined position out of the read out image data to form a reduced image at the time of reading out the image data from said means for obtaining image data.

Further, the image processing apparatus of this invention comprises means for detecting a radiation image which detects the exposure and detects a radiation image by generating an electrical signal corresponding to the exposure, means for obtaining image data which divides the radiation image into a plurality of blocks and reads out electrical signals from said means for detecting a radiation image in a parallel manner for the respective blocks to generate image data, means for calculating a representative value of a block which calculates the representative values of the image data for the respective blocks when reading out the image data from said means for obtaining image data, and means for forming a reduced image which forms a reduced image based on the respective signals for one pixel made of said representative values of the respective blocks obtained by said means for calculating a representative value of a block.

According to this invention, image processing for a radiation image can be carried out at a high speed.

What is claimed is:

1. An apparatus for processing a radiation image, comprising:

detecting means, having a plurality of detecting elements arranged in a two dimensional arrangement, for acquiring the radiation image and converting the acquired radiation image into electric signals as image signals, and for outputting the image signals; and image processing means for applying an image processing to the image signals, the image processing means comprising normalization processing means for converting the image signals based on a characteristic peculiar to the detecting means into normalized image signals, which are proportional to an amount of radiation irradiated to the detecting means or to a logarithm of the amount of the radiation and includes a predetermined signal value.

2. The apparatus of claim 1, wherein the image processing means further comprises gradation processing means for applying at least a gradation conversion processing to the normalized image signals.

3. The apparatus of claim 2, further comprising:

noise characteristics storing means for storing noise characteristics information peculiar to the detecting means; wherein the normalization processing means applies a processing to the image signals on the basis of the noise characteristics information so as to obtain the normalized image signals.

4. The apparatus of claim 2, further comprising:

image acquiring information storing means for storing control information regarding the acquiring; wherein the image processing means obtains an image processing condition by using the control information stored by the image acquiring information storing means.

5. The apparatus of claim 2, wherein the image processing means further comprises interest region setting means for setting a desired region of interest by analyzing the image signals; and representative signal determining means for determining at least a representative signal value on the basis of image signals within the region of interest; and wherein the normalization processing means applies the processing to the image signals such that the representative signal value corresponds to the predetermined signal value, thereby obtaining the normalized image signals.

6. The apparatus of claim 5, wherein the representative signal determining means prepares a histogram of image signals in the region of interest, extracts a signal range corresponding to a subject within the region of interest on the basis of the histogram, and determines one or both of an approximately minimum value and an approximately maximum value in the signal range as the representative signal value.

7. The apparatus of claim 5, wherein the representative signal determining means prepares a histogram of image signals in the region of interest, extracts a signal range corresponding to a subject from the region of interest on the basis of the histogram, and determines a signal value whose cumulative histogram value in the signal range becomes the predetermined cumulative histogram value, as the representative signal value.

8. The apparatus of claim 2, further comprising:

gradation conversion curve storing means for storing a plurality of gradation conversion curves, wherein the gradation processing means selects a gradation conversion curve from the plurality of gradation conversion curves stored by the gradation conversion curve storing means and conducts the gradation conversion processing on the basis of the selected gradation conversion curve.

9. The apparatus of claim 8, wherein the gradation processing means selects the gradation conversion curve from the plurality of gradation conversion curves stored by the gradation conversion curve storing means on the basis of the control information regarding the acquiring.

10. The apparatus of claim 2, further comprising:

standard gradation conversion curve storing means for storing a plurality of standard gradation conversion curves; wherein the gradation processing means selects the standard gradation conversion curve from the plurality of basis gradation conversion curves stored by the standard gradation conversion curve storing means, prepares a desired gradation conversion curve by modifying the selected standard gradation conversion curve and conducts the gradation conversion processing on the basis of the prepared gradation conversion curve.

11. The apparatus of claim 10, wherein the gradation processing means selects the standard gradation conversion curve from the plurality of standard gradation conversion curves stored by the standard gradation conversion curve storing means on the basis of the control information regarding the acquiring.

12. The apparatus of claim 2, wherein the image processing means comprises frequency enhancing means for conducting a frequency enhancing processing.

13. The apparatus of claim 2, wherein the image processing means comprises a dynamic range compression processing means for conducting a dynamic range compression processing.

14. Apparatus for processing a radiation image, comprising:
   a detector, including a plurality of detecting elements configured in a two dimensional arrangement, which acquires and converts the radiation image into electric signals as image signals, and which outputs the image signals; and
   an image processor which image processes the image signals, the image processor including a normalization processor which converts the image signals based on a characteristic peculiar to the detector into normalized image signals which are proportional to an amount of radiation irradiated to the detector or to a logarithm of the amount of radiation, and includes a predetermined signal value.

15. The apparatus as defined by claim 14, wherein the image processor further comprises a gradation processor which applies at least a gradation conversion processing to the normalized image signals.

16. The apparatus as defined by claim 15, further comprising:
   a noise characteristic storing device which stores noise characteristic information peculiar to the detector,
   wherein the normalization processor applies a processing to the image signals on the basis of the noise characteristic information so as to obtain the normalized image signals.

17. The apparatus as defined by claim 15, further comprising:
   an image acquiring information storage device which stores control information regarding the acquiring of the radiation image,
   wherein the image processor obtains an image processing condition by using the control information stored by the image acquiring information storage device.

18. The apparatus as defined by claim 15, wherein the image processor further comprises an interest region setter which sets a desired region of interest by analyzing the image signals; and
   a representative signal determiner which determines at least a representative signal value on the basis of image signals within the region of interest; and
   wherein the normalization processor applies processing to the image signals such that the representative signal value corresponds to the predetermined signal value, thereby obtaining the normalized image signals.

19. The apparatus as defined by claim 18, wherein the representative signal determiner prepares a histogram of image signals in the region of interest, extracts a signal range corresponding to a subject within the region of interest on the basis of the histogram, and determines one or both of an approximately minimum value and an approximately maximum value in the signal range as the representative signal value.

20. The apparatus as defined by claim 18, wherein the representative signal determiner prepares a histogram of image signals in the region of interest, extracts a signal range corresponding to a subject from the region of interest on the basis of the histogram, and determines a signal value whose cumulative histogram value in the signal range becomes the predetermined cumulative histogram value, as the representative signal value.

21. The apparatus as defined by claim 15, further comprising:
   a gradation conversion curve storage device which stores a plurality of gradation conversion curves, wherein the gradation processor selects a gradation conversion curve from the plurality of gradation conversion curves stored by the gradation conversion curve storage device and conducts the gradation conversion processing on the basis of the selected gradation conversion curve.

22. The apparatus as defined by claim 15, wherein the gradation processor selects the gradation conversion curve from the plurality of gradation conversion curves stored by the gradation conversion curve storage device on the basis of the control information regarding the acquiring of the radiation image.

23. The apparatus as defined by claim 15, further comprising:
   a standard gradation conversion curve storage device which stores a plurality of standard gradation conversion curves;
   wherein the gradation processor selects the standard gradation conversion curve from the plurality of basis gradation conversion curves stored by the standard gradation conversion curve storage device, prepares a desired gradation conversion curve and conducts the gradation conversion processing on the basis of the prepared gradation conversion curve.

24. The apparatus of claim 23, wherein the gradation processor selects the standard gradation conversion curve from the plurality of standard gradation conversion curves stored by the standard gradation conversion curve storage device on the basis of the control information regarding the acquiring.

25. The apparatus of claim 15, wherein the image processor comprises a frequency enhancer which conducts frequency enhancing processing.

26. The apparatus of claim 15, wherein the image processor comprises a dynamic range compression processor which conducts dynamic range compression processing.

* * * * *